United States Patent
Qian et al.

(10) Patent No.: US 10,425,968 B2
(45) Date of Patent: Sep. 24, 2019

(54) APPARATUS AND METHOD FOR DIFFERENTIAL BEAMFORMING BASED RANDOM ACCESS IN WIRELESS COMMUNICATION SYSTEM

(71) Applicant: Samsung Electronics Co., Ltd, Gyeonggi-do (KR)

(72) Inventors: Chen Qian, Beijing (CN); Bin Yu, Beijing (CN); Qi Xiong, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/424,663

(22) Filed: Feb. 3, 2017

(65) Prior Publication Data

US 2017/0223744 A1 Aug. 3, 2017

(30) Foreign Application Priority Data

Feb. 3, 2016 (CN) .......................... 2016 1 0076349

(51) Int. Cl.
*H04W 74/08* (2009.01)
*H04W 16/28* (2009.01)
*H04B 7/06* (2006.01)

(52) U.S. Cl.
CPC ...... *H04W 74/0833* (2013.01); *H04B 7/0695* (2013.01); *H04W 16/28* (2013.01); *H04B 7/063* (2013.01)

(58) Field of Classification Search
CPC .................................. H04B 7/02; H04L 27/28
(Continued)

(56) References Cited

U.S. PATENT DOCUMENTS

2006/0114158 A1  6/2006  Chiang et al.
2010/0123625 A1  5/2010  Martin et al.
(Continued)

FOREIGN PATENT DOCUMENTS

WO    2015147717 A1    10/2015

OTHER PUBLICATIONS

Cheol Jeong, et al., "Random Access in Millimeter-Wave Beamforming Cellular Networks: Issues and Approaches", IEEE Communications Magazine, Jan. 2015, 6 pages.
(Continued)

*Primary Examiner* — Iqbal Zaidi

(57) ABSTRACT

The present disclosure relates to a pre-5th-Generation (5G) or 5G communication system to be provided for supporting higher data rates beyond 4th-Generation (4G) communication system such as Long Term Evolution (LTE). The present disclosure provides a differential beamforming based random access method, base station, and user equipment, wherein the differential beamforming based random access method comprises, by a base station: receiving a preamble sequence from a first terminal in a differential beamforming receiving mode; determining a base station beam direction angular deviation based on the preamble sequence; and adjusting a base station beam according to the base station beam direction angular deviation, and transmitting a random access response signal to the first terminal through the adjusted base station beam. In the present disclosure, by detecting a base station beam direction angular deviation in a differential beamforming receiving mode, a base station receiving beam can be adjusted to an optimal beam faster than a beam polling way of the prior art, thereby improving the performance of a random access procedure.

18 Claims, 27 Drawing Sheets

(58) Field of Classification Search
USPC .......................... 370/328–491; 375/219–322
See application file for complete search history.

(56) References Cited

U.S. PATENT DOCUMENTS

| | | |
|---|---|---|
| 2014/0010178 A1 | 1/2014 | Yu et al. |
| 2016/0029358 A1 | 1/2016 | Hou et al. |
| 2016/0173978 A1* | 6/2016 | Li .......................... G10L 21/02 381/92 |
| 2016/0359596 A1* | 12/2016 | Wild .................... H04B 7/0695 |
| 2017/0026962 A1* | 1/2017 | Liu ....................... H04W 52/10 |
| 2017/0201894 A1* | 7/2017 | Byun ................... H04W 16/32 |

OTHER PUBLICATIONS

International Telecommunications Union, "IMT Traffic Estimates Beyond Year 2020", Document 5D/TEMP/466-E, Oct. 21, 2014, 35 pages.
International Telecommunications Union, "Future Technology Trends of Terrestrial IMT Systems", Report ITU-R M.2320-0, Nov. 2014, 32 pages.
International Telecommunications Union, "IMT Vision—Framework and Overall Objectives of the Future Development of IMT for 2020 and Beyond", Recommendation ITU-R M.2083-0, Sep. 2015, 21 pages.
ISA/KR, "International Search Report," Application No. PCT/KR2017/000948, dated May 8, 2017, Korean Intellectual Property Office, Daejeon, KR, 3 pages.
ISA/KR, "Written Opinion of the International Searching Authority," PCT/KR2017/000948, dated May 8, 2017, Korean Intellectual Property Office, Daejeon, KR, 9 pages.

* cited by examiner

FIG.16

APPARATUS AND METHOD FOR DIFFERENTIAL BEAMFORMING BASED RANDOM ACCESS IN WIRELESS COMMUNICATION SYSTEM

CROSS-REFERENCE TO RELATED APPLICATION(S) AND CLAIM OF PRIORITY

The present application is related to and claims priority under 35 U.S.C. § 119(a) to a Chinese Patent Application filed in the Chinese Intellectual Property Office on Feb. 3, 2016 and assigned Serial No. 201610076349.2, the contents of which are herein incorporated by reference.

TECHNICAL FIELD

The present disclosure relates to a wireless communication system, and in particular to an apparatus and a method for a differential beamforming based random access.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The rapid development of information industry, particularly the increasing demand from the mobile Internet and the Internet of Things (IoT), brings about unprecedented challenges in the future mobile communications technology. According to the ITU-R M. [IMT.BEYOND 2020.TRAFFIC] issued by the International Telecommunication Union (ITU), it can be expected that, by 2020, mobile services traffic may grow nearly 1,000 times as compared with that in 2010 (4G era), and the number of user device connections may also be over 17 billion, while a vast number of IoT devices gradually expand into the mobile communication network, and the number of connected devices may be even more amazing. In response to this unprecedented challenge, the communications industry and academia have prepared for 2020s by launching an extensive study of the fifth generation of mobile communications technology (5G). Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

The random access procedure, as an important step in a wireless communication system, is used for establishing uplink synchronization between a user equipment (UE) and a base station (BS), for allocating by the base station an identifier (ID) to the UE for identification of the UE, or the like. The performance of random access directly influences the use experience of UE. In conventional wireless communication systems, such as LTE and LTE-Advanced, the random access procedure is applied in many scenarios, for example, establishment of initial connections, cell handover, re-establishment of uplink connections, re-establishment of radio resource control (RRC) connections, or the like. And the random access is divided into contention-based random access and contention-free random access, depending upon whether the UE uses the preamble sequence resources exclusively or not. Since a preamble sequence is selected from the same preamble sequence resources during the attempt of establishment of an uplink connection by UEs in the contention-based random access, it may be possible for a plurality of UEs to select a same preamble sequence to be transmitted to the base station. Hence, a contention resolution mechanism becomes an important research aspect of random access. How to reduce the contention probability and how to rapidly resolve contentions that have already taken place are key indicators that influence the performance of random access.

The contention-based random access procedure in LTE-A consists of four steps, as shown in FIG. 2. In step 1, a UE randomly selects one preamble sequence from a preamble sequence resource pool and transmits the preamble sequence to a base station. The base station performs correlation detection on an access signal so as to identify the preamble sequence transmitted by the UE. In step 2, the base station transmits a random access response (RAR) to the UE. The RAR includes a random access preamble sequence identifier, a timing advance (TA) indication determined according to time delay estimation between the UE and the base station, a temporary cell-radio network temporary identifier (C-RNTI), and time-frequency resources allocated to the UE for a next uplink transmission. In step 3, the UE transmits a message 3 (Msg3) to the base station according to information included in the RAR. The Msg3 includes a terminal identifier, an RRC connection request, among the others, and the terminal identifier is unique to the UE and used for resolving contentions. In step 4, the base station transmits a contention-resolution identifier to the UE. The contention-resolution identifier is a terminal identifier of the UE which is the ultimate winner of the contention resolution. The UE upgrades the temporary C-RNTI to C-RNTI after detecting the identifier thereof, transmits an acknowledge (ACK) signal to the base station to implement the random access procedure, and waits for the scheduling of the base station. Otherwise, the UE may start a new random access procedure after a period of time delay.

For a contention-free random access procedure, the base station may allocate a preamble sequence to the UE since it has known the identifier of the UE. Hence, the UE does not need to randomly select a sequence before transmitting the preamble sequence, and instead, the UE uses an allocated preamble sequence. The base station may transmit a corresponding random access response after detecting the allocated preamble sequence, and the random access response includes timing advance, an allocation of uplink resources and other information. After receiving the random access response, the UE recognizes that the uplink synchronization is completed and waits for the further scheduling of the base station. Therefore, a contention-free random access procedure just comprises 2 steps: the step 1 is to transmit the preamble sequence, and the step 2 is to transmit the RAR.

A millimeter-wave communication is a possible key technology in 5G. By increasing the carrier frequency to the millimeter-wave bands, the available bandwidth may be greatly increased, and hence the transmission rate of the system may be greatly improved. For resistance of the properties of high fading and high loss in wireless channels in the millimeter-wave bands, a millimeter-wave communication system generally uses the beamforming technology, that is, the beam energy is concentrated in a certain direction by using a weighting factor. During wireless communication, the base station and the UE search for an optimal beam pair by means of polling or the like so that a received signal-to-noise ratio (SNR) on the UE side is maximized. Since the UE and the base station do not know the direction of the optimal beam pair when the initial connection is established, the random access in the millimeter-wave communication system faces great challenges. One possible way is as described in [Random Access in Millimeter-Wave Beamforming Cellular Networks: Issues and Approaches], where, in step 1, UE tries all possible beam pairs at the time of transmitting a preamble sequence to search for an optimal beam pair which may be used in the subsequent steps of random access. In this solution, although an optimal beam pair may be obtained in step 1 of the random access procedure, the time required to transmit and detect the preamble sequence in step 1 may be prolonged. Hence, there is a great room for improving the performance.

In conclusion, in order to further improve the competitiveness of the millimeter-wave communication system in 5G candidate technologies, it is necessary to propose a technical solution that effectively solves the performance-associated problems of the random access procedure in the millimeter-wave system and improves the performance of the random access procedure in the millimeter-wave communication system, and finally achieves a goal of providing shorter access time delay and better access experience for users on the UE side.

SUMMARY

The purpose is to address an issue that too much time is required to transmit a preamble sequence since too much time is required to search for an optimal beam pair during a random access procedure in a beamforming-based millimeter-wave communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates a diagram of constructing a preamble sequence from component preamble sequences according to the present disclosure;

DETAILED DESCRIPTION

Figure 1:
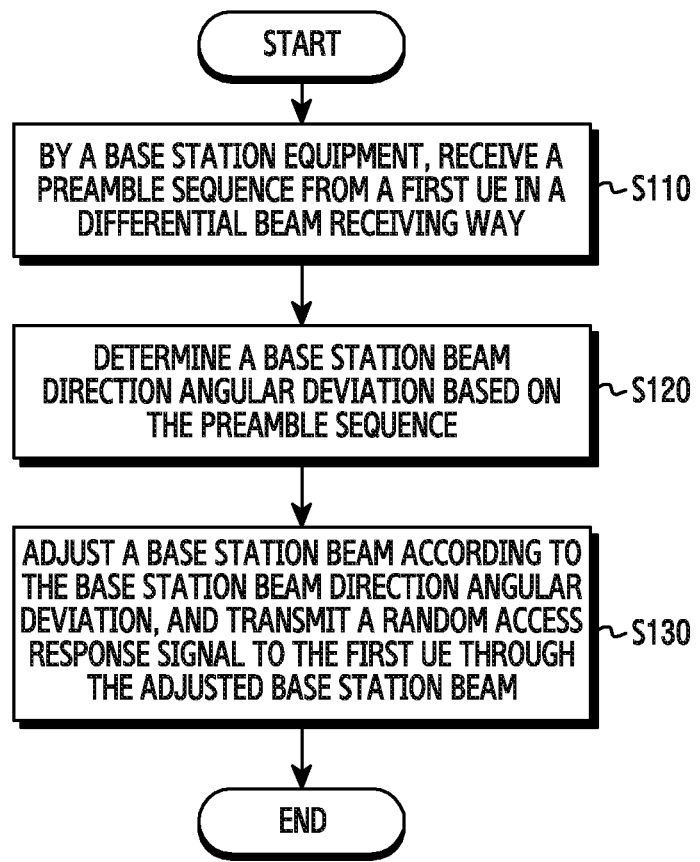
FIG. 1 illustrates a flow diagram of a differential beamforming based random access method according to one embodiment of the present disclosure.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged.

Hereinafter the embodiments of the present disclosure will be described in details, and the examples of these embodiments have been illustrated in the accompanying drawings, throughout which same or similar reference numerals refer to same or similar elements or elements having same or similar functions. These examples described by reference to the accompanying drawings are illustrative for the purpose of explaining the present disclosure only, which shall not be regarded as constituting any limitations thereto.

Hereinafter, a user equipment (UE) is a device for a user. The UE may be referred as "a terminal," "a mobile station (MS)," "a subscriber station (SS)," "a remote terminal (RT)," "a wireless terminal (WT)," "a user device," or another term having an equivalent technical meaning. A base station (BS) is a device which provides a wireless access to the UE. The BS may be referred as "evolved node B (eNB)," "an access point (AP)," "a 5th generation node (5G node)," "a wireless point," "a transmission/reception point (TRP)," or another term having an equivalent technical meaning.

In various embodiments, the UE or the BS may perform differential beamforming. The differential beamforming is a beamforming technique to use two different but related beams. For instance, the two different but related beams may be referred as 'a sum beam' and 'a differential beam'. By using the relationship of these two beams, receiver/transmitter may obtain the beam direction error between the actual beam direction and probe beam direction. Specifically, the sum beam may be generated by using the normal beam generation coefficient (e.g., discrete fourier transform (DFT)-like beam coefficient). Meanwhile, the relationship between the differential beam and sum beam is that, the first half of coefficients are the same while the last half of coefficients are the opposite. In this way, the beam direction error can be obtained even simpler.

FIG. 1 illustrates a flow diagram of a differential beamforming based random access method according to one embodiment of the present disclosure.

S110: By base station, a preamble sequence from a first user equipment (UE) is received in a differential beamforming receiving mode; S120: a base station beam direction angular deviation is determined based on the preamble sequence; and S130: a base station beam is adjusted according to the base station beam direction angular deviation, and a random access response signal is transmitted to the first UE through the adjusted base station beam.

Preferably, in S110, the base station receives a preamble sequence from the first UE in a plurality of base station beam directions through a sum beam and a differential beam.

Preferably, S110 comprises S111 and S112. S111: The base station receives an access signal from the first UE in a differential beamforming receiving mode; and S112: preamble sequence correlation detection is performed on the access signal to determine that the access signal comprises any preamble sequences.

Preferably, in S120, based on preamble sequence correlation detection results, base station beam direction deviation detection is performed to determine a base station beam direction angular deviation.

Preferably, in S112, preamble sequence correlation detection is performed on the access signal in a plurality of base station beam directions through a sum beam and a differential beam.

Preferably, the sum beam uses sum beam weight coefficients as beamforming weight coefficients, and the differential beam uses differential beam weight coefficients as beamforming weight coefficients.

More preferably, the sum beam weight coefficients can be divided into a first sum beam part and a second sum beam part, and the differential beam weight coefficients can be divided into a first differential beam part and a second differential beam part, wherein the first sum beam part is the same as the first differential beam part, and a plurality of elements in the second differential beam part are opposite numbers of corresponding elements in the second sum beam part.

Preferably, the sum beam weight coefficients can be expressed by the following equation:

$$w_{sum} = \left[1, e^{\frac{j2\pi \sin(\theta)d}{\lambda}}, \ldots, e^{\frac{j2\pi(N_{sum}-1)\sin(\theta)d}{\lambda}}\right]^T$$

where $N_{sum}$ is the number of antennas used by a receiving array using the sum beam weight coefficients, θ is a sum beam central direction, d is an antenna elements spacing of the sum beam array, λ is the wavelength of a transmitted signal; and the sum beam weight coefficients can be beam weight coefficient $N_{sum}$ dimensional vector, wherein the $n^{th}$ element is $$w_{sum}(n) = e^{\frac{j2\pi(n-1)\sin(\theta)d}{\lambda}},$$

where $1 \leq n \leq N_{sum}$ and the differential beam weight coefficients can be expressed by the following equation:

$$w_{dif} = \begin{bmatrix} 1, e^{\frac{j2\pi \sin(\theta)d}{\lambda}}, \ldots, e^{\frac{j2\pi\left(\frac{N_{dif}}{2}-1\right)\sin(\theta)d}{\lambda}}, \\ -e^{\frac{j2\pi\left(\frac{N_{dif}}{2}\right)\sin(\theta)d}{\lambda}}, \ldots, -e^{\frac{j2\pi(N_{dif}-1)\sin(\theta)d}{\lambda}} \end{bmatrix}^T$$

where $N_{dif}$ is the number of antennas used by a transmitting array using the differential beam weight coefficients, and $N_{sum}=N_{dif}$; and the differential beam weight coefficients can be beam weight coefficient $N_{dif}$ dimensional vector, wherein the first $N_{dif}/2$ elements of the differential beam weight coefficients are the same as the first $N_{sum}/2$ elements of the sum beam weight coefficients, and the second $N_{dif}/2$ elements of the differential beam weight coefficients are opposite numbers of the second $N_{sum}/2$ elements of the sum beam weight coefficients.

Preferably, the step of performing preamble sequence correlation detection on the access signal in a plurality of base station beam directions through a sum beam and a differential beam comprises: performing preamble sequence correlation detection on the access signal in the plurality of base station beam directions through a sum beam, to determine a first correlation detection result with respect to any preamble sequences; performing preamble sequence correlation detection on the access signal in the plurality of base station beam directions through a differential beam, to determine a second correlation detection result with respect to any preamble sequences; and determining that an access signal comprising any preamble sequences is detected in at least one base station beam direction, if it is decided that the first correlation detection result and/or the second correlation detection result in at least one base station beam direction meets a first decision condition.

The first determination condition comprises at least any one of the following: the first correlation detection result is greater than a first threshold, and the second correlation detection result is greater than the first threshold; the first correlation detection result is greater than a second threshold; and the second correlation detection result is greater than the second threshold, wherein the first threshold is less than the second threshold.

The step of performing base station beam direction deviation detection based on the preamble sequence correlation detection results to determine a base station beam direction angular deviation comprises: selecting a base station beam direction with the maximum receiving energy from at least one base station beam direction receiving any preamble sequences; and determining a base station beam direction angular deviation, based on the first correlation detection result and the second correlation detection result in the base station beam direction with the maximum receiving energy.

The step of adjusting a base station beam according to the base station beam direction angular deviation comprises: adjusting a base station beam direction and a base station beam width according to the base station beam direction angular deviation.

A first beam width in the base station beam direction is used to receive the preamble sequence and perform correlation detection; a second beam width in the adjusted base station beam direction is used to transmit a random access response signal; and the first beam width is not less than the second beam width.

Preferably, this method further comprises S140. S140: An Msg 3, which is transmitted by the first UE through a UE beam adjusted based on the beam indication information and the UE beam direction angular deviation, is received by the adjusted base station beam, and a corresponding contention resolution is transmitted through the adjusted base station beam.

Preferably, this method further comprises S100. S100: The base station transmits beam configuration information, wherein the beam configuration information at least comprises one of the following: indication information indicating whether the UE uses the differential beamforming transmitting mode; the beam width used by the UE to transmit a preamble sequence and the beam width used by the UE to transmit the subsequent data; the UE beam scanning cycle; and the base station beam scanning cycle.

Preferably, the beam configuration information further comprises: indication information indicating whether the base station uses a differential beamforming receiving mode.

Figure 3:
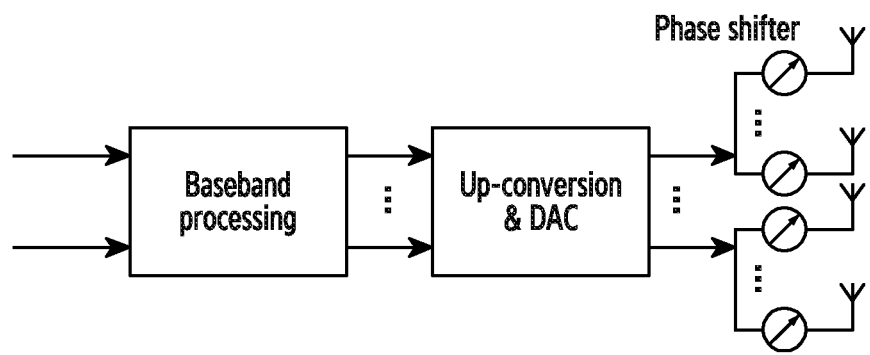
FIG. 3 illustrates a structure diagram of a transmitting end based on an antenna array according to the present disclosure.
Figure 4:
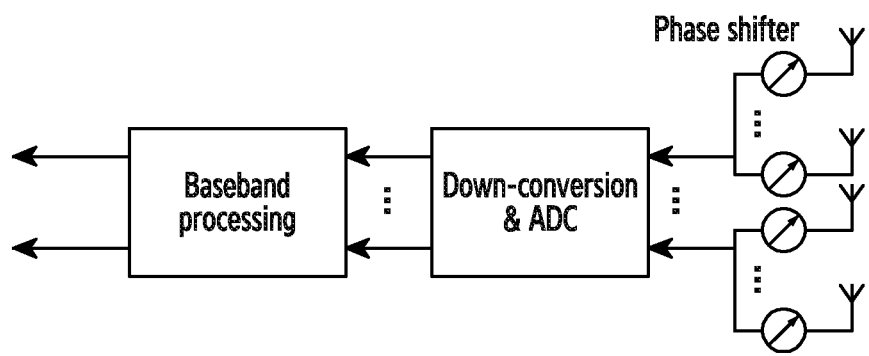
FIG. 4 illustrates a structure diagram of a receiving end based on an antenna array according to the present disclosure.

In the embodiment of the present disclosure, in a system operating in the millimeter-wave bands, both the base station and the UE use a transmitter structure based on an antenna array as shown in FIG. 3 and a receiver structure based on an antenna array as shown in FIG. 4. As shown in FIG. 3, each link subjected to baseband processing is connected to one antenna array consisting of $N_{st}$ antenna elements by an up-converter and a digital-to-analog converter (DAC), and the antennas elements in the antenna array may be adjusted only in phase; and by adjusting the phase, the antenna array may form a beam in an appropriate direction to implement beamforming of a millimeter-wave system. The receiver structure as shown in FIG. 4 is similar to that of FIG. 3, each baseband link is connected to one antenna array consisting of $N_{sr}$ antenna elements, and the antenna elements may be adjusted only in phase; and by adjusting the phase, the antenna array may adjust a receiving beam to an appropriate direction to increase a received signal-to-noise ratio (SNR). A communication system operating in the millimeter-wave bands depends on beamforming, and the matched beamforming can provide a maximum received SNR. Hence, for a millimeter-wave communication system, in addition to estimation of uplink synchronization and timing advance, the random access needs to determine an optimal transmitting-receiving beam pair, that is, to determine corresponding beamforming coefficients.

Figure 5:
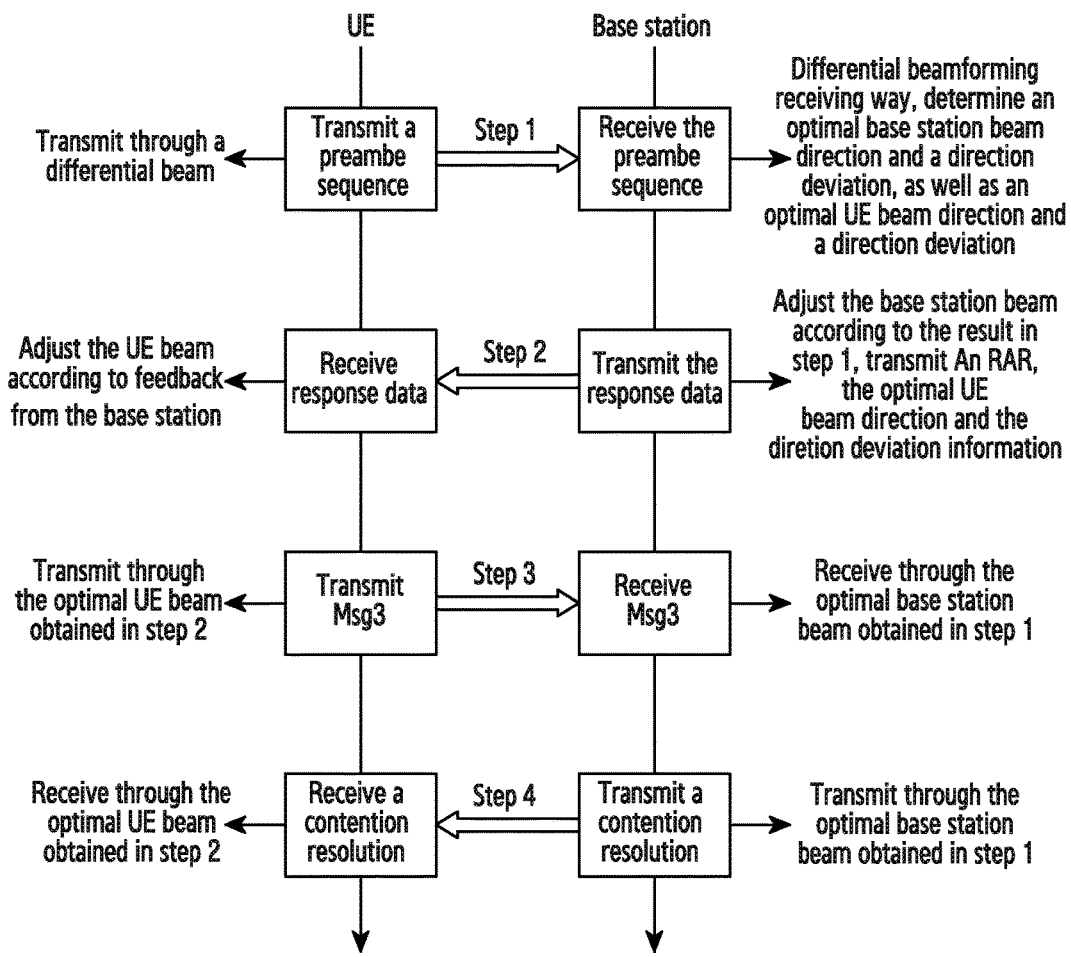
FIG. 5 illustrates a flowchart of a differential beamforming based random access scheme according to the present disclosure.

FIG. 5 illustrates a flowchart of a differential beamforming based random access procedure according to the present disclosure.

As shown in FIG. 5, the random access procedure consists of four steps.

In step 1, the UE transmits a preamble sequence to the base station, where the UE uses a differential beamforming transmitting mode while the base station uses a differential beamforming receiving mode. The base station can determine a base station beam direction angular deviation according to results of calculating a ratio of receiving energy of a differential beam to receiving energy of a sum beam, and adjust the base station beam direction based on the base station beam direction angular deviation to transmit and receive data in the subsequent steps; and meanwhile, the base station can determine a UE beam direction angular deviation according to the received energy of the differential beam and energy of the sum beam transmitted by the UE, for adjusting a UE beam direction.

The base station calculates energy of the differential beam and energy of the sum beam transmitted by the UE, which are received through a sum receiving beam and a differential receiving beam, wherein the receiving energy may be characterized by a value of preamble sequence correlation detection, so that a ratio of energy of the differential beam to energy of the sum beam transmitted by the UE may be obtained. By looking up a table, a deviation between an actual transmitting direction of UE and a beam direction used by the UE is obtained.

In step 2, the base station adjusts a base station beam according to the base station beam direction angular deviation determined in step 1, and transmits a random access response (RAR) through the adjusted base station beam, wherein the adjusted base station beam is the optimal base station beam. In addition, the base station transmits a UE beam direction with the maximum transmitting energy obtained in step 1, i.e., the optimal UE beam direction and the UE beam direction angular deviation, together with the RAR, to the UE.

In step 3, the UE adjusts a UE beam according to the received optimal UE beam direction and UE beam direction angular deviation, and transmits an Msg3, wherein the adjusted UE beam is the optimal UE beam; and the base station receives the Msg3 according to the adjusted base station beam determined in step 1.

In step 4, the base station transmits a contention resolution according to the adjusted base station beam determined in step 1, and the UE receives the contention resolution according to the adjusted UE beam determined in step 2.

In the above steps, the optimal UE beam and the optimal base station beam form an optimal UE-base station beam pair.

In the above steps, both the UE and the base station use a differential beamforming solution. It is to be noted that, the differential beamforming solution may be used only on the base station side or the UE side, while the conventional beam polling solution may be used on the other side. Due to the use of the differential beamforming solution, the above random access procedure may reduce the selection process of an optimal beam pair and reduce the probability of occurrence of contentions, so that the performance of the random access procedure in a beamforming-based millimeter-wave communication system is improved.

The random access flow as shown in FIG. 5 is applicable to a contention-based random access procedure. For a contention-free random access procedure, although the preamble sequence transmitted by the UE is allocated by the base station, it is still needed to determine an optimal UE-base station beam pair between the base station and the UE. Hence, when determining an optimal UE-base station beam pair, it may be still completed in a differential beamforming based way as provided in this solution.

Figure 6:
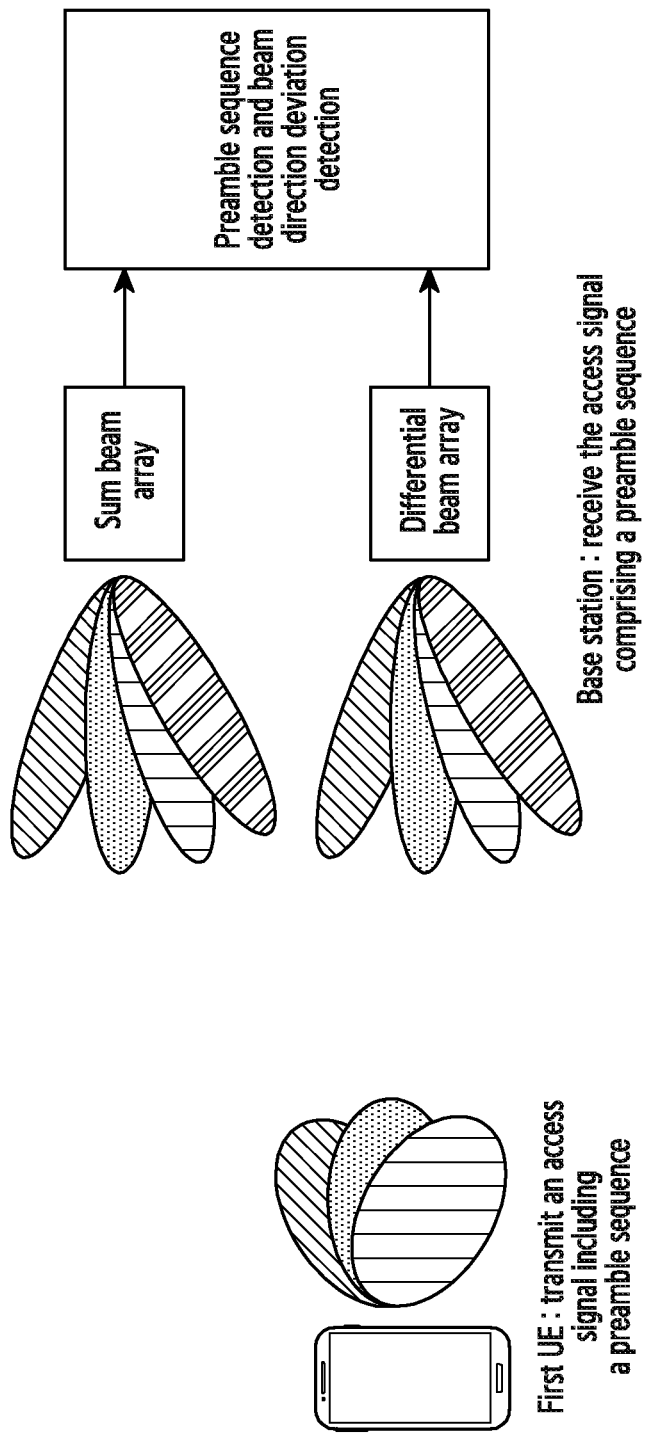
FIG. 6 illustrates a diagram of receiving an access signal comprising a preamble sequence in a differential beamforming mode by the base station according to one specific embodiment of the present disclosure.

In a first specific application scenario of the present disclosure, FIG. 6 is a schematic diagram of receiving an access signal comprising a preamble sequence in a differential beamforming mode on the base station side according to one specific embodiment of the present disclosure.

Referring FIG. 6, a first UE transmits an access signal to a base station, and the base station receives the access signal from the first UE in a plurality of base station beam directions through a sum beam and a differential beam; subsequently, preamble sequence correlation detection is performed on the access signal in the plurality of base station beam directions through a sum beam and a differential beam; when it is detected that the access signal comprises a preamble sequence, base station beam direction deviation detection is performed based on the results of the preamble sequence correlation detection to determine a base station beam direction angular deviation; and the base station beam direction is adjusted according to the base station beam direction angular deviation, and a random access response signal is transmitted to the first UE in the adjusted base station beam direction.

Figure 7:
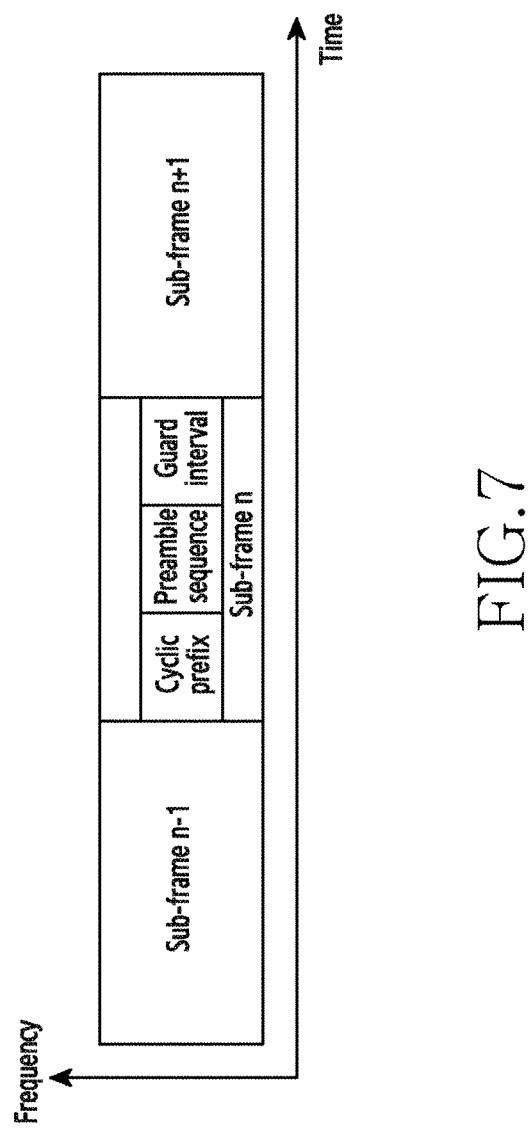
FIG. 7 illustrates a flowchart of a differential beamforming based random access procedure according to the present disclosure.

The preamble sequence in this embodiment is transmitted in a random access channel. Considering that the available bandwidth of a millimeter-wave system is usually large, for ease of detection by the base station, the random access channel is arranged in the middle of the uplink available bandwidth, occupying six resource blocks (RBs) in the frequency domain and lasting for one or more sub-frames in time. The random access channel consists of three parts, i.e., the sequence, the cyclic prefix and the guard interval. FIG. 7 illustrates a diagram of a random access channel lasting for one sub-frame.

The first UE transmits a same or different preamble sequences in a plurality of UE beam directions. The set of available preamble sequences is divided into a plurality of disjoint subsets if different preamble sequences are transmitted, and each UE selects from one subset one preamble sequence to be transmitted. As shown in FIG. 6, it is assumed that the first UE transmits the preamble sequence in three UE beam directions, the set $\Sigma$ of available preamble sequences is divided into three disjoint subsets $\Sigma 1$, $\Sigma 2$ and $\Sigma 3$, satisfying the following equations:

$$\Sigma_1 \cap \Sigma_2 \cap \Sigma_3 = \emptyset \qquad \text{Equation 1)}$$

$$\Sigma_1 \cup \Sigma_2 \cup \Sigma_3 = \Sigma \qquad \text{Equation 2).}$$

Preferably, the Equation 2) may be adjusted to use a union of the subsets as a subset of a preamble sequence set $\Sigma$. Some of preamble sequences may be reserved for, for example, a contention-free random access procedure. When the first UE transmits a preamble sequence by using a beam in a first direction, the preamble sequence is randomly selected from the subset $\Sigma_1$; when the first UE transmits a preamble sequence by using a beam in a second direction, the preamble sequence is randomly selected from the subset $\Sigma_2$; and when the first UE transmits a preamble sequence by using a beam in a third direction, the preamble sequence is randomly selected from the subset $\Sigma_3$.

In this embodiment, when a same preamble sequence is used, the UE just needs to select one preamble sequence for random access every time. In this case, the preamble sequence is highly utilized and the complexity of correlation detection performed by the base station on each preamble sequence is low, but the preamble sequence is long. When a different preamble sequence is used, the complexity of detection at the base station is high while the preamble sequence is short.

Subsequently, the base station receives the access signal from the first UE in a plurality of base station beam directions through a sum beam and a differential beam.

Specifically, the base station performs detection with two arrays, one of which using sum beam weight coefficients as beamforming weight coefficients. The sum beam weight coefficients can be expressed by the following equation:

$$w_{sum} = \left[1, e^{\frac{j2\pi \sin(\theta)d}{\lambda}}, \ldots, e^{\frac{j2\pi(N_{sum}-1)\sin(\theta)d}{\lambda}}\right]^T$$

where $N_{sum}$ is the number of antennas used by a receiving array using the sum beam weight coefficients, $\theta$ is a sum beam central direction, d is an antenna elements spacing of the receiving array, $\lambda$ is the wavelength of a received signal.

The other array uses differential beam weight coefficients as beamforming weight coefficients. The differential beam weight coefficients can be expressed by the following equation:

$$w_{dif} = \begin{bmatrix} 1, e^{\frac{j2\pi \sin(\theta)d}{\lambda}}, \ldots, e^{j2\pi\left(\frac{N_{dif}}{2}-1\right)\frac{\sin(\theta)d}{\lambda}}, \\ -e^{j2\pi\left(\frac{N_{dif}}{2}\right)\frac{\sin(\theta)d}{\lambda}}, \ldots, -e^{\frac{j2\pi(N_{dif}-1)\sin(\theta)d}{\lambda}} \end{bmatrix}^T$$

where $N_{dif}$ is the number of antennas used by a receiving array using the differential beam weight coefficients. The numbers of antennas $N_{sum}$ and $N_{dif}$ of the two arrays may be the same or different. In this embodiment, it is assumed that $N_{sum}=N_d=N$, that is, the numbers of antennas of the two arrays are the same. By adjusting the number N of antennas of each receiving array, the beamwidth may be adjusted, so that the coverage of the beam may be adjusted. It is to be noted that, both the sum beam receiving array and the differential beam receiving array on the base station side in FIG. 5 may consist of a plurality of antenna arrays in the receiver structure of FIG. 4.

Figure 8:
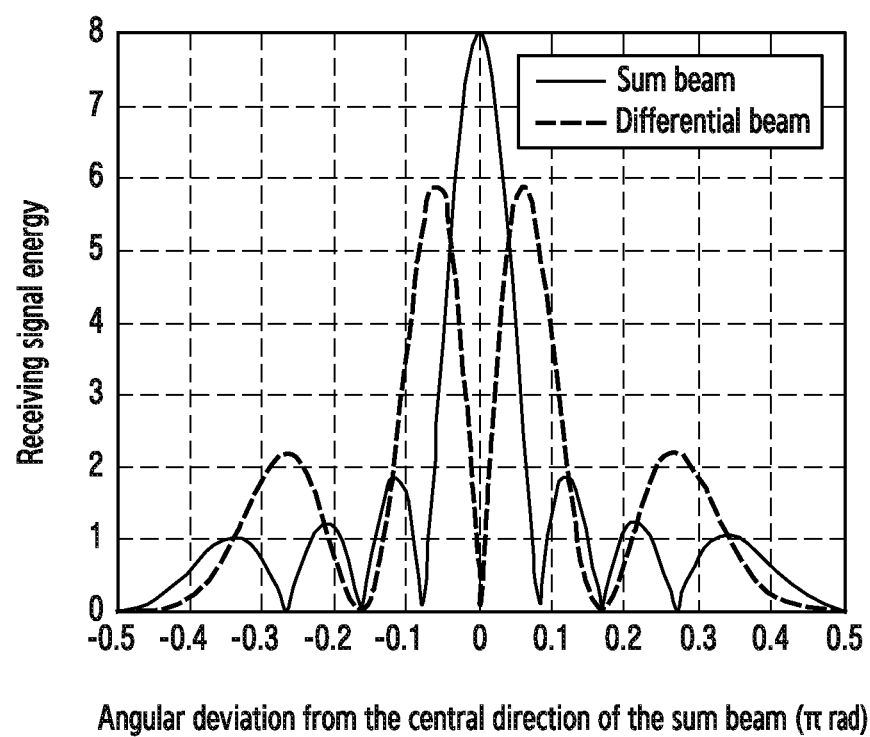
FIG. 8 illustrates a diagram of receiving energy through a sum beam and of a differential beam according to the present disclosure.
Figure 9:
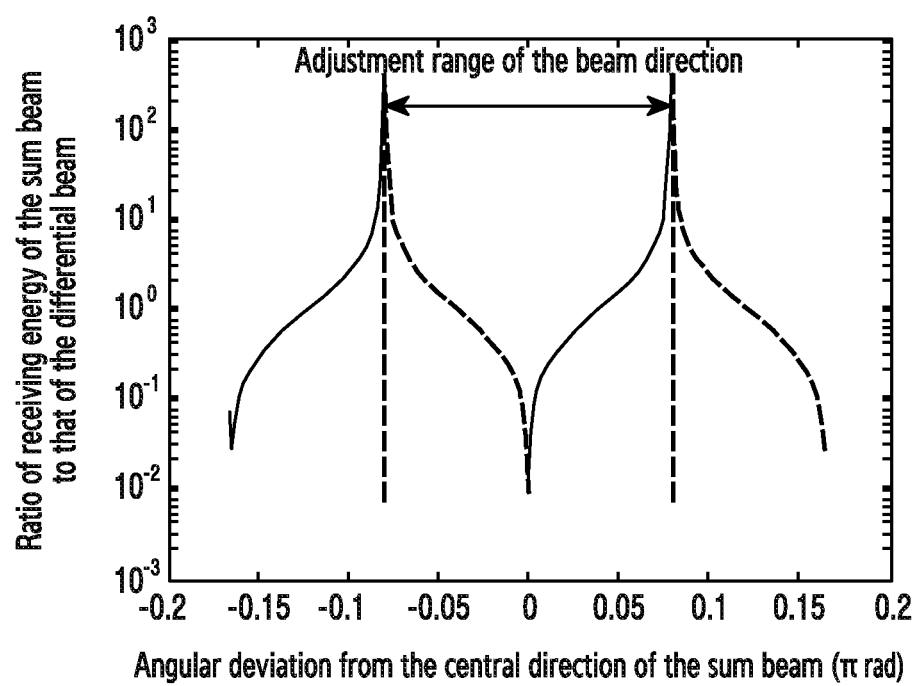
FIG. 9 illustrates a diagram of a ratio of receiving energy through a differential beam to receiving energy through a sum beam according to the present disclosure.

Here, taking the first UE equipped with eight antennas as an example, FIG. 8 is a schematic diagram of receiving energy of a sum beam and of a differential beam. As shown in FIG. 8, the directions of the sum beam and the differential beam are the same, but energy distributions of the two beams are different. Hence, a ratio of receiving energy of the two beams may be used as a basis of determining a deviation from a central beam direction. FIG. 9 is a schematic diagram of a ratio of receiving energy of a differential beam to receiving energy of a sum beam. As shown in FIG. 9, within a certain angular deviation range, the angular deviation corresponds to the receiving energy one-to-one. In an example as shown in FIG. 9, this angular deviation range is approximately [−15°, 15°]. If an angular deviation is within this range, a lookup table may be made according to a ratio of receiving energy and a corresponding angular deviation, so that a respective angular deviation is determined by looking up the lookup table according to the ratio of receiving energy.

It is to be noted that, similar effects may be achieved by using a ratio of receiving energy of the sum beam to the receiving energy of the differential beam. However, the relationship between the obtained ratio of energy and the deviation of the beam direction is different, and the lookup table used is also different.

Figure 10:
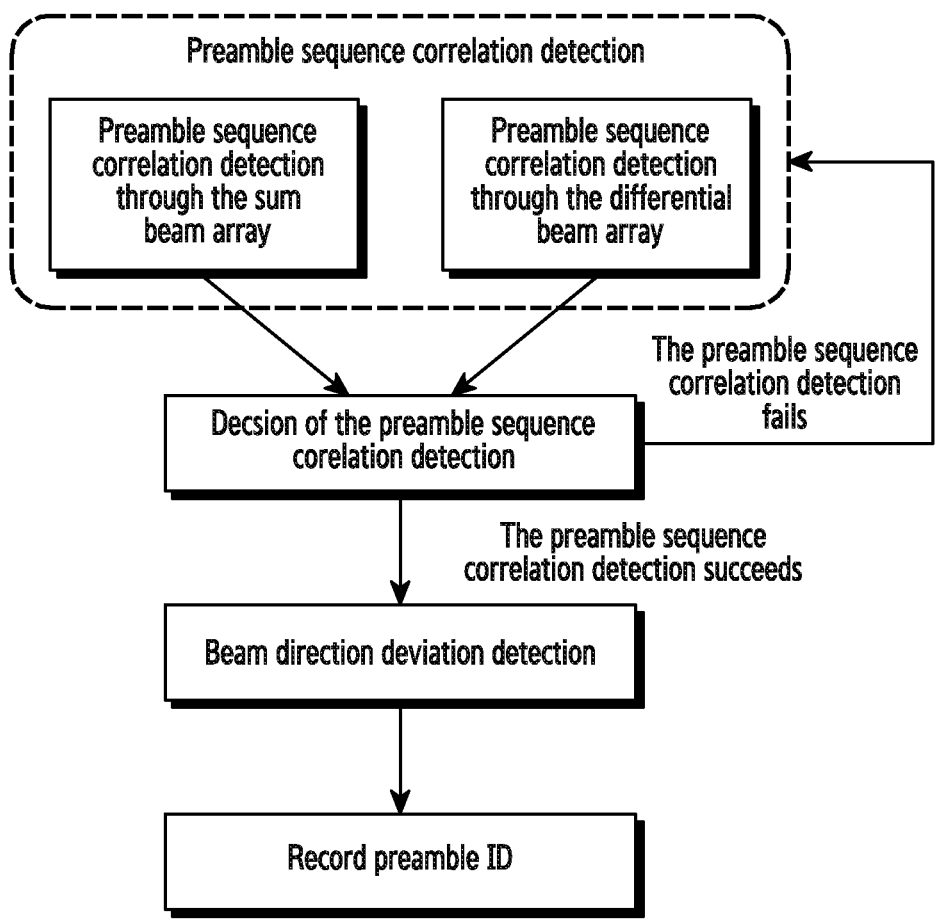
FIG. 10 illustrates a flow chart of processing an access signal by the base station according to the present disclosure.

Then, preamble sequence correlation detection is performed on the access signal in a plurality of base station beam directions through a sum beam and a differential beam. Specifically, FIG. 10 illustrates a diagram of a flow of processing an access signal by the base station according to the present disclosure. As shown in FIG. 10, preamble sequence correlation detection is performed on the access signal by both the sum beam array and the differential beam array, and results of correlation detection performed by the sum beam array and the differential beam array are combined as a final result for decision that whether a preamble sequence is detected. The correlation detection results may specifically show that the receiving energy of a certain preamble sequence is obtained.

For example, the base station receives an access signal through a plurality of base station beams in continuous time domains and performs correlation detection; performs preamble sequence correlation detection on the access signal through the sum beam at a certain moment, to determine a first correlation detection result with respect to a certain preamble sequence, that is, the receiving energy of the sum beam with respect to a certain preamble sequence is $R_{sum}$; performs preamble sequence correlation detection on the access signal through the differential beam at the same moment, to determine a second correlation detection result with respect to this preamble sequence, that is, the receiving energy of the differential beam with respect to this preamble sequence is $R_{dif}$; if $R_{sum} > \eta_1$ and $R_{sum} > \eta_1$, or $R_{sum} > \eta_2$, or $R_{dif} > \eta_2$, it may be determined that an access signal comprising this preamble sequence is detected, otherwise this preamble sequence is not detected. Wherein, $\eta_1$ and $\eta_2$ are the first threshold and the second threshold, respectively, and $\eta_1 \leq \eta_2$.

As shown in FIG. 8, the energy distributions of the sum beam and the differential beam are complementary. That is, the receiving energy of the differential beam is zero when the receiving energy of the sum beam reaches the maximum, and the receiving energy of the differential beam reaches the maximum when the receiving energy of the sum beam is zero. Those two situations correspond to a case in which the peak direction of the sum beam points to the UE and a case in which the peak direction of the differential beam points to the UE, respectively. Hence, for the differential beam and the sum beam, the larger second threshold is used as a basis of determining the detection of a preamble sequence, respectively. Otherwise, the smaller first threshold should be used for determination simultaneously for the differential beam and the sum beam. The first threshold $\eta_1$ and the second threshold $\eta_2$ are determined by factors such as the cell radius, the number of antennas used by the UE and the base station for beamforming during the transmitting of the preamble sequence, the length of the preamble sequence, etc.

If the final correlation detection result shows that no any preamble sequence is detected, the subsequent steps are not proceeded; and if the final correlation detection result shows that one or more preamble sequences are detected, beam direction deviation detection is performed for each of the detected preamble sequences, that is, a deviation between a receiving direction and an array beam direction is obtained according to a ratio of the correlation detection result of the sum beam array to the correlation detection result of the differential beam array.

For example, if it is detected that a certain preamble sequence is received in a plurality of base station beam directions, a base station beam direction with the maximum correlation detection result, i.e., with the maximum receiving energy, is selected from the plurality of base station beam directions, according to correlation detection results detected with respect to this preamble sequence in each of the base station beam directions; and a base station beam direction angular deviation is determined by calculating a ratio of the first correlation detection result to the second correlation detection result in the base station beam direction with the maximum receiving energy, for example, it is assumed that the receiving energy of the sum beam with respect to this preamble sequence is $R_{sum}$ and the receiving energy of the differential beam with respect to this preamble sequence is $R_{dif}$, a base station beam direction angular deviation is determined by calculating a ratio of $R_{sum}$ and $R_{dif}$. A lookup table may be made, showing the correspondence between the ratio of differential beam receiving energy to sum beam receiving energy and beam direction angular deviation, so that a respective base station beam direction angular deviation is determined by looking up the lookup table according to the ratio of $R_{sum}$ and $R_{dif}$. The base station beam direction angular deviation is used for adjusting and correcting the beam direction in the subsequent steps of the random access procedure.

Figure 11:
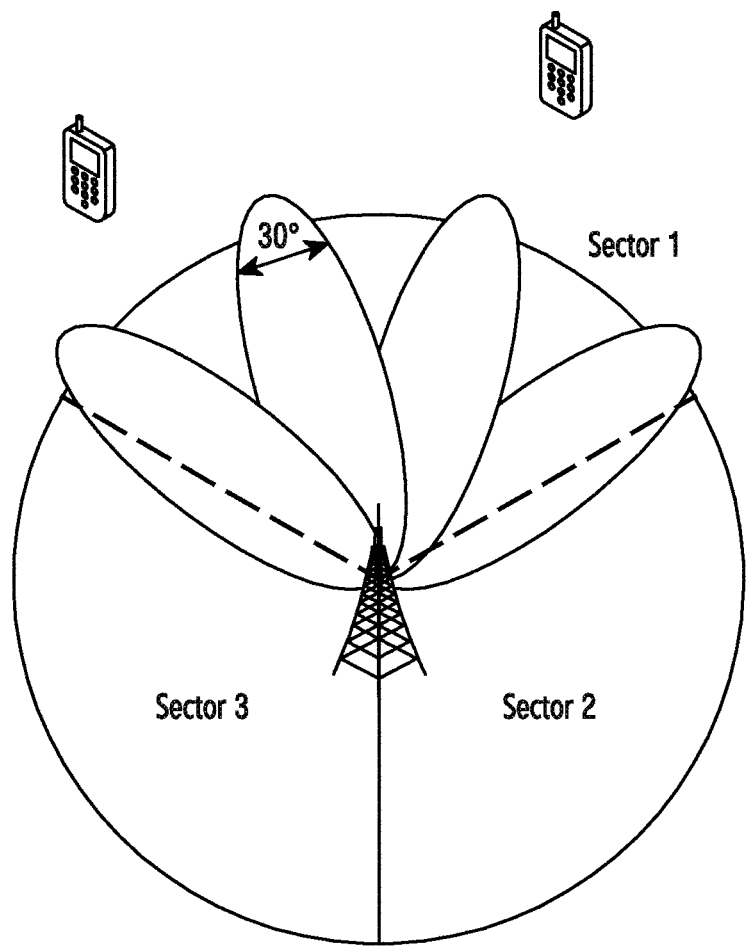
FIG. 11 illustrates a diagram of receiving a preamble sequence in a plurality of base station beam directions according to the present disclosure.

To reduce the search time while ensuring the coverage of the beam, the base station scans different directions through one or more wide sum beam/differential beam arrays. FIG. 11 illustrates a diagram of receiving a preamble sequence in a plurality of base station beam directions, where scanning by a plurality of base station beams is performed to improve the success rate of detection of a preamble sequence. As shown in FIG. 11, one cell is divided into three sectors each covering a range of 120°, and different sectors are independent of each other. For a range of 120° covered by sectors 1, four base station beam pairs with a beamwidth of 30° are used for covering reception, and each of the base station beam pairs includes a sum beam and a differential beam with a same base station beam direction.

Figure 12:
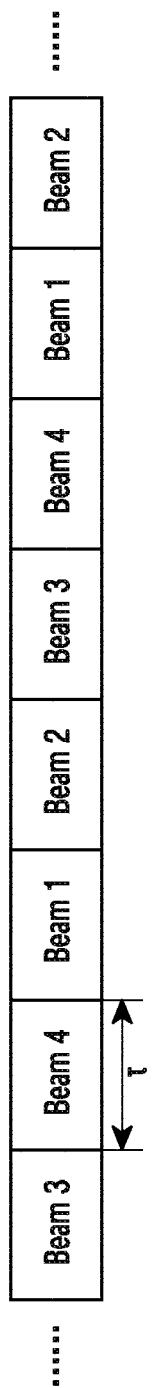
FIG. 12 illustrates a diagram of a base station-side receiving beam scanning mode according to one preferred embodiment of the present disclosure.

The base station beam pairs in different base station beam directions are distinguished in a time division method. For example, a continuous scanning time for each base station beam direction is τ, and a receiving scanning timing is as shown in FIG. 12. Beam 1 to beam 4 represent four receiving beam directions for covering one sector, i.e., corresponding sum beam directions. The continuous scanning time for the base station beam pairs in each beam direction is τ, used for scanning each beam direction. When the scanning reception of the all four beam directions is completed, a next cycle of scanning is started. The base station beam in each beam direction receives one or more random access sub-channels.

When the transmitting of a certain preamble sequence is detected, the base station beam direction with the maximum receiving energy in reception of the preamble sequence and the corresponding base station beam direction angular deviation are determined. In the subsequent random access procedure, beams with a narrow beamwidth may be used as the transmitting beam and the receiving beam. For example, in an example as shown in FIG. 11, in the base station beam direction, a first beam width of 30° is used for reception of a preamble sequence and for correlation detection, and in the subsequent steps of random access, a narrower second beam width is used for transmitting a random access response signal. For example, by increasing the number of antenna array elements of the base station, the first beam width is adjusted to the second beam width for transmitting the subsequent RARs, receiving the Msg3 and transmitting the contention resolution.

Preferably, after detecting a preamble sequence, the base station can determine the base station beam direction angular deviation according to the strength of a received signal of the preamble sequence so as to adjust the beam direction to the optimal beam direction, and notify the first UE through a downlink control channel or downlink shared channel or a downlink broadcast channel. More preferably, the way that the base station notifies the first UE is a fixed base station beam direction; and the first UE traverses and searches all directions according to the first UE's beamforming coefficient codebook until locating a direction with the maximum receiving strength. In the subsequent steps of random access, the first UE receives and transmits signal through this direction beam.

In the embodiment of the present disclosure, by detecting a preamble sequence by a base station beam with a wide first beam width while detecting the base station beam direction angular deviation in a differential beamforming receiving mode, the optimal beam on the base station side can be found faster than the beam polling method of the prior art; subsequently, by using a base station beam with a narrow second beam width while adjusting the beam direction according to the base station beam direction angular deviation detected in the differential beamforming receiving mode, the received SNR in the subsequent steps may be improved and this facilitates the improvement of the performance of the random access procedure. In addition, the adjustment of the beam direction also facilitates the reduction of the contention probability and the performance of the random access procedure is thus improved.

Since a base station beam with a wide first beam width is used in order to improve the speed of detection during the detection of a preamble sequence, the cell coverage will be slightly lower than that in the conventional beam direction polling solution. In order to increase the cell coverage, a longer preamble sequence may be used. For example, if the beam direction polling solution uses a beam with a beam width of 10° to cover a sector of 120° while using a same preamble sequence length, compared with an example as shown in FIG. 11, since a beam with a narrow beamwidth has more concentrated energy, the cell radius that can be supported by this beam is larger and the cycle of completing beam direction scanning of one cell is four times than that in the example as shown in FIG. 11.

In order to compensate the weakness in cell coverage in this embodiment, the length of the preamble sequence thereof may be set to be longer than that of the preamble sequence in the conventional solution, for example, may be set to be twice of that in the conventional solution. At this time, in terms of beam scanning cycle, the conventional solution is still 1.5 times longer than this embodiment. Since two arrays are used for correlation detection in this embodiment, the cell coverage will be close to that in the conventional solution after increasing the length of the preamble sequence, even with better performance. The preamble sequence may be lengthened in various ways as follows: for example, repeating a same preamble sequence, and designing a longer preamble sequence. It is to be noted that, although the solution proposed in this embodiment is applicable to a contention-based random access procedure, determining an optimal beam direction on the base station side in a differential beamforming receiving mode in the base station is also applicable to a contention-free random access procedure. That is, first UE transmits a preamble sequence allocated by a base station, and the base station receives an access signal through a sum beam array and a differential beam array and performs preamble sequence correlation detection to determine a corresponding base station beam direction angular deviation; the base station adjusts the beam direction according to the base station beam direction angular deviation, and transmits a random access response through a narrow base station beam; and the first UE implements the contention-free random access procedure after receiving the random access response, and waits for the further scheduling of the base station.

For a contention-free random access procedure, in some scenes, for example, scenarios such as cell handover, the base station may acquire some prior information including the possible directions of UE by means of inter-base-station communication or the like; and according to these prior information, the base station may reduce directions for beam scanning and further reduce the time required by the differential beamforming based random access procedure.

Specifically, the flow of contention-free based random access procedure integrated with the differential beam is as follows: step 1, the base station acquires some prior information about the UE, the prior information including possible directions; step 2, the base station detects a preamble sequence in the possible beam directions determined in step 1; step 3, if the base station detects the transmitting of a preamble sequence, a beam direction deviation is further determined according to the correlation detection result of the differential beam and the correlation detection result of the sum beam, the beam direction and the beam width are adjusted when transmitting a random access response, and a beam with a narrow beam width is used for transmitting.

Preferably, if a plurality of same preamble sequences in a plurality of beam directions are detected, the following steps are further included: determining a priority of a plurality of same preamble sequences in a plurality of base station beam directions; and selecting a preamble sequence in a base station beam direction with the highest priority to perform the beam direction deviation detection. The way of determining a priority of a plurality of same preamble sequences in a plurality of base station beam directions includes but is not limited to: determining a priority in order of receiving energy, in the plurality of base station beam directions, corresponding to each of the preamble sequences; and determining a priority in order of time when each of the preamble sequences are detected in the plurality of base station beam directions.

In a second specific application scenario of the present disclosure, a base station receives an access signal from a first UE in a differential beamforming receiving mode, and accordingly performs preamble sequence correlation detection. For a random access procedure, there may be a plurality of UEs transmitting same preamble sequences. Hence, a base station may detect a plurality of same preamble sequences from different UEs within one scanning cycle. In this case, contention may occur among the plurality of UEs. Specifically, during a random access procedure in a differential beamforming receiving mode, same preamble sequences may be detected in a plurality of receiving beam directions, and hence a priority of a plurality of same preamble sequences in a plurality of base station beam directions is determined according to a predetermined criterion, and a preamble sequence with the highest priority is selected to perform the beam direction deviation detection. The predetermined criterion at least comprises: energy criterion: determining a priority in order of respective receiving energy of preamble sequences in a plurality of base station beam directions; determining total receiving energy of preamble sequences according to the sum of receiving energy of the sum beam array and the differential beam array, when the base station detects same preamble sequences, since higher preamble sequence transmitting energy may be used when UE which failed in the previous access tries to access again; by the base station, arranging the total receiving energy of the plurality of same preamble sequences in descending order, selecting a preamble sequence with highest energy, and determining that the UE which transmits this preamble sequence has the highest serving priority; and time order criterion: determining a priority in order of time when the preamble sequences are detected in a plurality of base station beam directions; and selecting the earliest found UE to serve, by comparing the time when the preamble sequences are detected in each base station beam direction. For example, the duration of each base station beam direction is further divided into time slots, as shown in FIG. 13.

Figure 13:
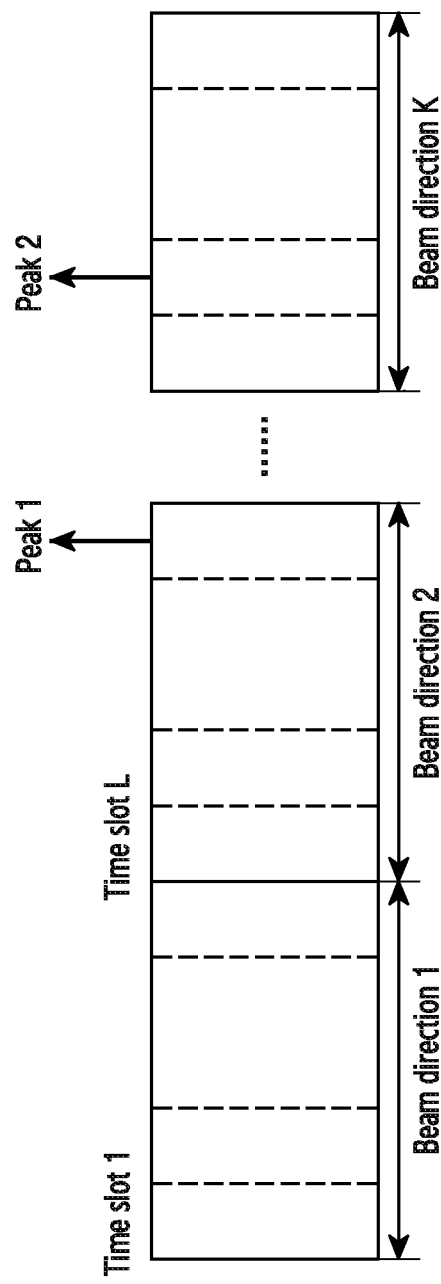
FIG. 13 illustrates a diagram of timing when a preamble sequence is detected according to another preferred embodiment of the present disclosure.

As shown in FIG. 13, each period corresponding to each base station beam direction is divided into L time slots. If same preamble sequences are detected in a plurality of base station beam directions, the positions of time slots where the peak of the correlation detection result occurs are compared and a beam direction in which a preamble sequence is detected first is determined according to the positions of time slots. Same preamble sequences are detected in both the beam direction 2 and the beam direction K. However, in the beam direction 2, the correlation peak 1 occurs in time slot L, and in the beam direction K, the correlation peak 2 occurs in time slot 2. Furthermore, the two peaks are results of detection with respect to same preamble sequences. In this case, although the correlation peak 1 occurs prior to the correlation peak 2, it believes that peak 2 has a higher priority and may be served preferentially.

More preferably, a priority of a plurality of same preamble sequences is determined by combining the above two predetermined criterions. For example, first, a priority is determined according to the time order criterion; and if preamble sequences transmitted by a plurality of UEs have a same priority under the time order criterion, the priority is then determined according to the energy criterion and a UE with the highest priority is selected to access first.

Figure 2:
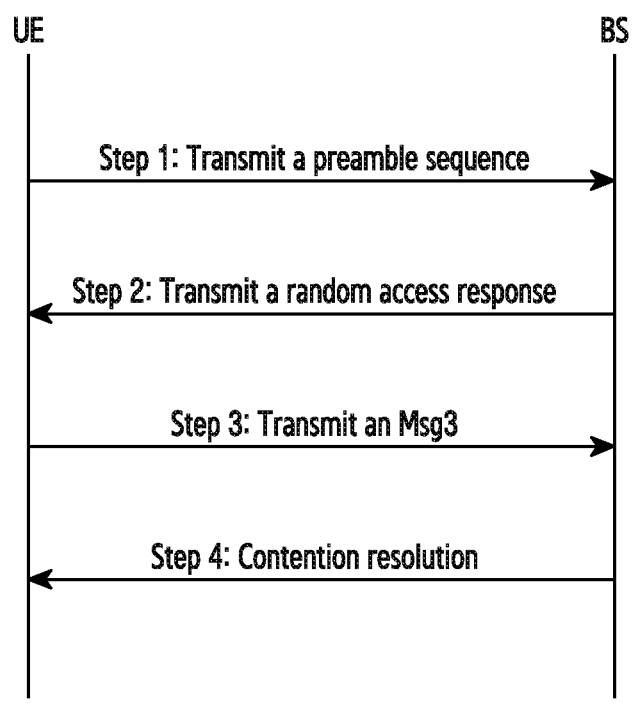
FIG. 2 illustrates a flow diagram of a contention-based random access method of the prior art.

For another example, first, a priority is determined according to the energy criterion, and if preamble sequences transmitted by a plurality of UEs have a same priority under the energy criterion, the priority is then determined according to the time order criterion. In this manner, since there is a difference between the sum beam and the differential beam in energy peak, in an eight-antenna example as shown in FIG. 2, the highest receiving energy of the sum beam is roughly 1.3 times with about 1.25 dB of the highest receiving energy of the differential beam. Hence, during the determination of the priority, the energy determination criterion of two adjacent priorities may consider the difference in energy between the sum beam receiving array and the differential beam receiving array. In the example as shown in FIG. 2, the energy determination criterion of two adjacent priorities may have a difference of 1.25 dB.

After determining the priority of a plurality of same preamble sequences, a base station beam direction with a preamble sequence with the highest priority may be selected, a corresponding base station beam direction angular deviation is determined, the receiving beam direction is adjusted according to the base station beam direction angular deviation, and a narrow beam width is selected to transmit and receive signals in the subsequent steps.

If the preamble sequences in a plurality of base station beam directions have a similar priority, a plurality of base station beam directions, which are not adjacent to each other, are selected to perform base station beam direction angular deviation detection; each base station beam direction is adjusted according to the corresponding base station beam direction angular deviation, and a narrow beam width is used to transmit and receive signals in the subsequent steps.

In one preferred embodiment (see FIG. 1), this method further comprises S150 (not shown in FIG. 1). S150: when a preamble sequence is transmitted by the first UE in a differential beam transmitting mode, UE beam direction deviation detection is performed based on the received preamble sequence which is transmitted by the first UE through a sum beam and a differential beam, to determine a UE beam direction with the maximum transmitting energy and a UE beam direction angular deviation.

S160 specifically comprises S161 (not shown) and S162 (not shown). S161: A UE beam direction with the maximum transmitting energy is selected from at least one UE beam direction transmitting a preamble sequence; and S162: UE beam direction deviation detection is performed based on the preamble sequences transmitted through the sum beam and the differential beam in the UE beam direction with the maximum receiving energy, to determine a UE beam direction angular deviation.

Preferably, preamble sequence correlation detection is performed, through the sum beam and the differential beam, on the preamble sequence transmitted through the sum beam in the UE beam direction with the maximum transmitting energy, to determine a third correlation detection result; preamble sequence correlation detection is performed, through the sum beam and the differential beam, on the preamble sequence transmitted through the differential beam in the UE beam direction with the maximum transmitting energy, to determine a fourth correlation detection result; and the UE beam direction angular deviation is determined based on the third correlation detection result and the fourth correlation detection result.

Preferably, when an access signal, which is transmitted by the first UE in a differential beamforming transmitting mode and comprises a preamble sequence consisting of a plurality of same component preamble sequences, is received, this method comprises: summing the correlation detection results of the plurality of component preamble sequences as a correlation detection result of the preamble sequence.

Preferably, this method further comprises: performing UE beam direction deviation detection based on the plurality of same component preamble sequences to determine a component UE beam direction angular deviation of each component preamble sequence; calculating an average value of change values of the UE beam direction based on the component UE beam direction angular deviation of each component preamble sequence, and determining an angular movement velocity of the first UE based on the calculation result.

Preferably, this method further comprises: adjusting the base station beam width according to the angular speed of the first UE.

Preferably, this method further comprises: estimating the UE beam direction angular deviation based on the component UE beam direction angular deviation of the last one component preamble sequence.

Preferably, the random access response signal at least comprises: beam indication information indicative of the UE beam direction with the maximum transmitting energy, and the UE beam direction angular deviation.

Figure 14:
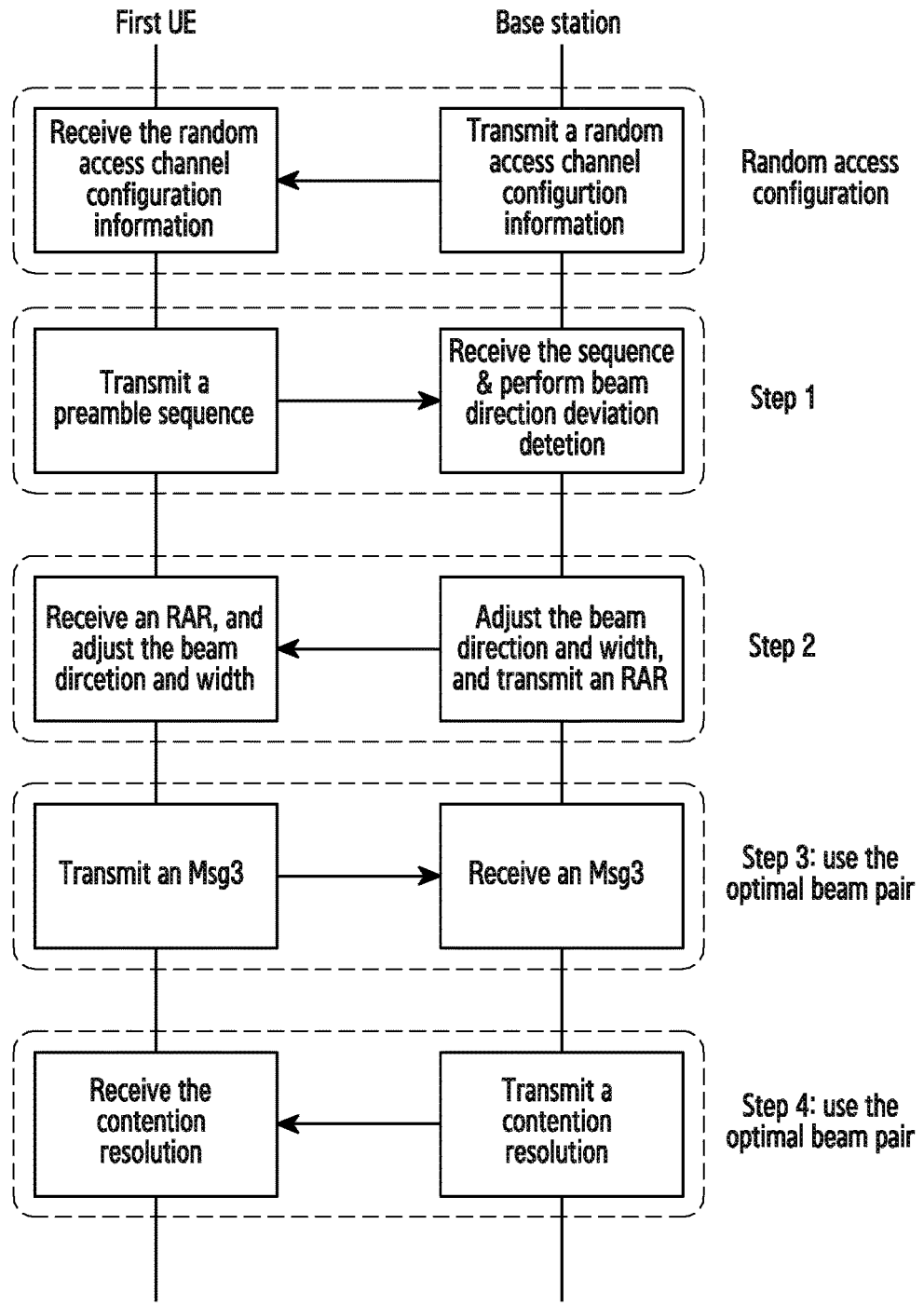
FIG. 14 illustrates a flowchart of a differential beamforming based random access procedure according to one specific embodiment of the present disclosure.

In a third specific application scenario of the present disclosure, it's a random access procedure in which the base station and the first UE, as the receiving end and the transmitting end, use the differential beamforming receiving mode and the differential beamforming transmitting mode. Both the base station and the first UE use a transmission structure based on an antenna array, and both the base station and the first UE use a transmission structure based on a differential beamforming. FIG. 14 illustrates a flowchart of a differential beamforming based random access procedure.

Figure 15:
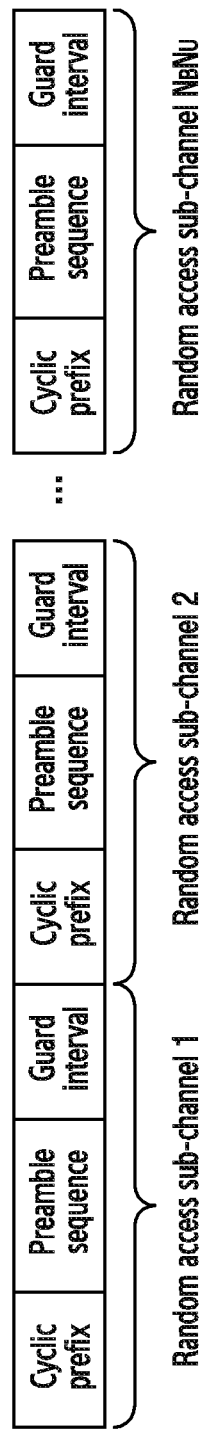
FIG. 15 illustrates a diagram of a random access channel structure according to one specific embodiment of the present disclosure.

As shown in FIG. 14, before the random access procedure, the base station transmits the random access configuration information to the first UE through a downlink control channel or downlink shared channel or a downlink broadcast channel; the random access configuration information comprises basic random access channel configuration information of the prior art, preamble sequence configuration information, indication information indicating whether the UE uses the differential beamforming transmitting mode, the beam width used by the UE to transmit data, the UE beam scanning cycle, the base station beam scanning cycle, and other beamforming configuration parameters. The UE beam scanning cycle and the base station beam scanning cycle determine, in unit of the number of sub-frames, a random access channel structure through which the first UE transmits a preamble sequence. For example, if the UE beam scanning cycle is $N_U$, it means that the UE scans in $N_U$ beam directions to implement the coverage of the whole space; and if the base station beam scanning cycle is $N_B$, it means that the base station scans in $N_B$ beam directions to implement the coverage of the whole space. As shown in FIG. 15, the UE divides a random access channel into $N_B N_U$ random access sub-channels. Compared with the prior art, since the receiving end and the transmitting end use a differential beamforming receiving mode and a differential beamforming transmitting mode, the scanning cycles of the base station and the first UE may be reduced; meanwhile, since a wider beam is used for coverage, the time required to select a base station-UE beam pair and the time required to transmit a preamble sequence are reduced. In order to increase the supported cell radius, a way of repeatedly transmitting same sub-sequences in a same preamble sequence can be used.

In step 1, the first UE randomly selects a preamble sequence after receiving the random access configuration information, and transmits the preamble sequence in a random access channel according to the configuration. When transmitting the preamble sequence, the UE uses a differential beamforming transmitting mode. For example, the preamble sequence is equally divided into two parts, the first part of which is transmitted through a sum beam and the second part is transmitted through a differential beam; or, the same preamble sequences are transmitted respectively through the sum beam and the differential beam in two different antenna ports with orthogonal time-frequency resources. The sequence transmitted through the sum beam is referred to as a sum beam sequence, and the sequence transmitted through the differential beam is referred to as a differential beam sequence. The sum beam sequence and the differential beam sequence may use same sequences, that is, the preamble sequence is repeatedly generated by the same sequences, or, the preamble sequence is divided into two parts.

The base station uses a differential beamforming receiving mode, that is, two antenna arrays, for receiving. For example, the first antenna array uses a sum beam receiving mode and the second antenna array uses a differential beamforming receiving mode. The base station first performs correlation detection on the preamble sequence, and determines a transmitting-receiving beam pair with the maximum receiving energy if the transmitting of a preamble sequence is detected. The transmitting-receiving beam pair with the maximum receiving energy comprises a base station beam direction with the maximum receiving energy and a UE beam direction with the maximum transmitting energy.

Subsequently, the base station beam direction angular deviation and the UE beam direction angular deviation are estimated.

During the correlation detection performed on the preamble sequence, the base station performs correlation detection on the sum beam receiving array and the differential beam receiving array, respectively, and judges whether the transmitting of a preamble sequence is detected by combining the correlation detection result of the sum beam and the correlation detection result of the differential beam. A ratio of the correlation detection result of the differential beam to the correlation detection result of the sum beam is calculated, and the base station beam direction angular deviation is determined by making a lookup table and looking up the lookup table. Subsequently, a ratio of the value of correlation detection of the sum beam sequence which is received by the sum beam receiving array and the differential beam receiving array, i.e., the third correlation detection result, to the value of correlation detection of the differential beam sequence which is received by the sum beam receiving array and the differential beam receiving array, i.e., the fourth correlation detection result, is calculated; and the UE beam direction angular deviation is determined by making a lookup table and looking up the lookup table.

In step 2, the base station selects a base station beam with a narrow beam width to transmit a random access response, according to the base station beam direction with the maximum receiving energy and the base station beam direction angular deviation determined in step 1. The random access response includes a preamble sequence identifier, a timing advance indication determined according to time delay estimation between the UE and the base station, a C-RNTI, time-frequency resources allocated to the UE for a next uplink transmission, a UE beam direction with the maximum receiving energy, and the UE beam direction angular deviation, wherein the UE beam direction with the maximum receiving energy is indicated by a beam ID, and the UE beam direction angular deviation may have a corresponding index by which the first UE looks up and determines the UE beam direction angular deviation.

In step 3, the first UE adjusts the UE beam direction according to the random access response transmitted by the base station, and transmits an Msg3 by a UE beam with a narrow beam width. The base station adjusts the base station beam direction by using the base station beam direction angular deviation determined in step 1, and uses a base station beam with a narrow beam width for receiving.

In step 4, the base station transmits a contention resolution through the base station beam with a narrow beam width by using the adjusted base station beam direction. The first UE uses the adjusted UE beam direction for receiving, implements the random access procedure, and waits for the allocation of uplink resources by the base station.

Compared with the beam polling based random access technique of the prior art, the differential beamforming based random access way as provided by this specific embodiment can effectively reduce the time required to search an optimal transmitting-receiving beam pair, and thus reduce the time delay of the random access procedure and improve the user experience on the UE side. Specifically, when the optimal transmitting-receiving beam pair is used for transmitting and receiving, a beam with a beam width of 10° is needed, and this may be implemented by using a uniformly-spaced linear array consisting of sixteen antenna elements. If a uniformly-spaced linear array consisting of eight antenna elements is used when a differential beamforming mode is used for receiving and transmitting, the distinguishable range is 30°. The base station scanning cycle and the UE scanning cycle may be reduced three times lower in the beam polling based random access solution. The time required to transmit a preamble sequence and search an optimal beam pair is reduced nine times lower in the beam polling based random access solution. Even if the differential beamforming based solution needs to use repeated preamble sequences in order to compensate weakness in cell coverage, for example, the receiving energy may decrease four times lower due to the reduction of two times lower of the number of antennas, in order to make up for the difference in energy, the preamble sequence is to be transmitted repeatedly for four times. In this case, the time required to transmit a preamble sequence and search an optimal beam pair is still only 4/9 of that in the beam polling based solution. The efficiency of the random access procedure is greatly improved.

The random access procedure based on the differential beamforming receiving mode and the differential beamforming transmitting mode as provided by this preferred embodiment enables the UE with a low priority to trigger failure faster when a contention occurs. For example, in a same receiving scanning beam direction, when same preamble sequences are transmitted by different UEs and one of the UEs has high transmission power because of failing in many attempts to access while the other one has low transmission power because of less attempts, the base station which uses the differential beamforming receiving mode also detects two corresponding preamble sequences, but the determined base station beam direction angular deviation may be closer to the UE direction with a high power. The greater the difference in power is, the closer the beam direction determined in the differential beamforming receiving mode is to the UE direction with a high power. When the beam direction is adjusted and a narrow base station beam is used to transmit the random access response, the UE with a low power has a low beamforming gain, and hence, the received energy is also low. As a result, the UE with a low power may have poor performance in receiving the random access response or even fail to receive the random access response. If the UE with a low power fails to receive the random access response within a specified time limit, the transmission power thereof may be increased to resend the preamble sequence, and a new random access procedure may begin. Hence, the differential beamforming based random access procedure can resolve the contentions faster and improve the efficiency in resolving contentions.

It is to be noted that the solutions proposed in the above embodiments are applicable to a contention-based random access procedure, but the solutions used in step 1 and step 2 in this embodiment are also applicable to a contention-free random access procedure. The difference lies in that: the UE transmits a preamble sequence specified by the base station; after the UE receives the random access response and the beam adjustment information from the base station, the random access procedure ends; and the UE and the base station also adjust the base station beam direction and the UE beam direction according to the base station beam direction angular deviation and the UE beam direction angular deviation, for the subsequent communication.

It is to be noted that, whether the UE and the base station transmit and receive the preamble sequence in the differential beamforming transmitting mode and the differential beamforming receiving mode may be adjusted according to the practical application scenarios. Whether the UE uses the differential beamforming transmitting mode is determined by the base station, that is, the UE is indicated by the indication information, which indicates whether the UE uses the differential beamforming transmitting mode, in the random access channel configuration information. The UE may not be informed whether the base station uses the differential beamforming receiving mode. However, since the random access channel structure may be influenced, the UE may be informed by the base station beam scanning cycle. That is, when the base station uses the differential beamforming receiving mode, the base station beam scanning cycle is short; and if the base station does not use the differential beamforming receiving mode, the base station beam scanning cycle is long. The base station also may explicitly notify the UE whether it uses the differential beamforming receiving mode. That is, the base station transmits, to the UE, indication information indicating whether the UE uses the differential beamforming receiving mode.

In a fourth specific application scenario of the present disclosure, the first UE uses a differential beamforming based random access procedure when in movement. The first UE and the base station use a transmission structure based on an antenna array, and the base station uses the differential beamforming transmitting mode.

Preferably, the first UE may use a long preamble sequence for transmitting, in order to increase the time required by the base station to detect the preamble sequence.

Figure 16:
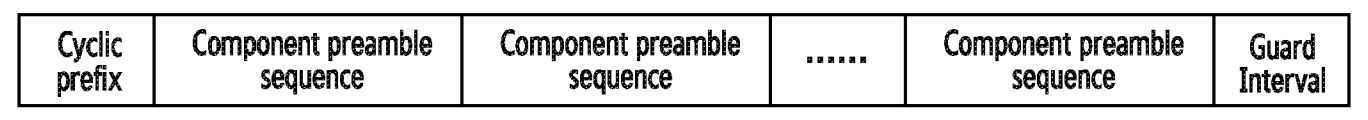

Preferably, the length of the preamble sequence is increased by repeating same preamble sequences. FIG. 16 illustrates a diagram of constructing a preamble sequence from component preamble sequences.

Figure 17:
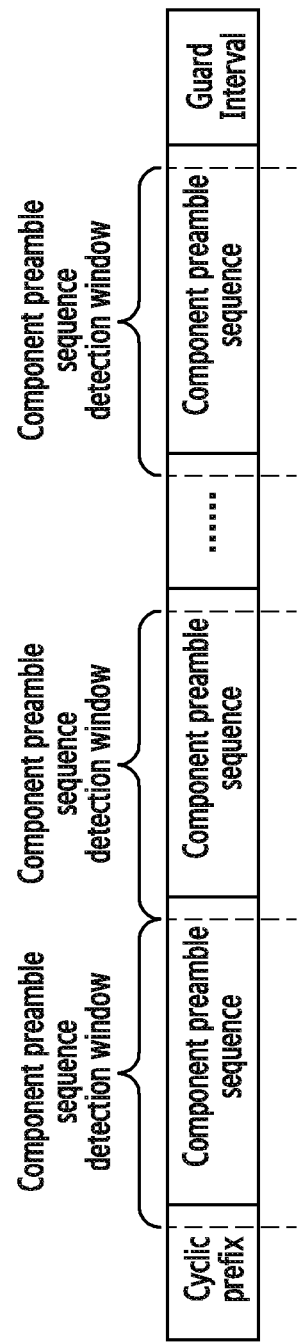
FIG. 17 illustrates a diagram of detecting a preamble sequence constructed from component preamble sequences according to the present disclosure.

As shown in FIG. 16, K component preamble sequences with a same shorter length are repeated to obtain a long sequence, and a cyclic prefix and a guard interval are added to this sequence to obtain a final preamble sequence. In detecting this long preamble sequence, the base station uses a window with a length consistent to the length of the component preamble sequences to perform detection on the component preamble sequences, and repeatedly performs detection for K times, as shown in FIG. 17. The correlation detection results of the component preamble sequences in K detection windows are superposed to obtain the correlation detection result of the preamble sequence.

Figure 18:
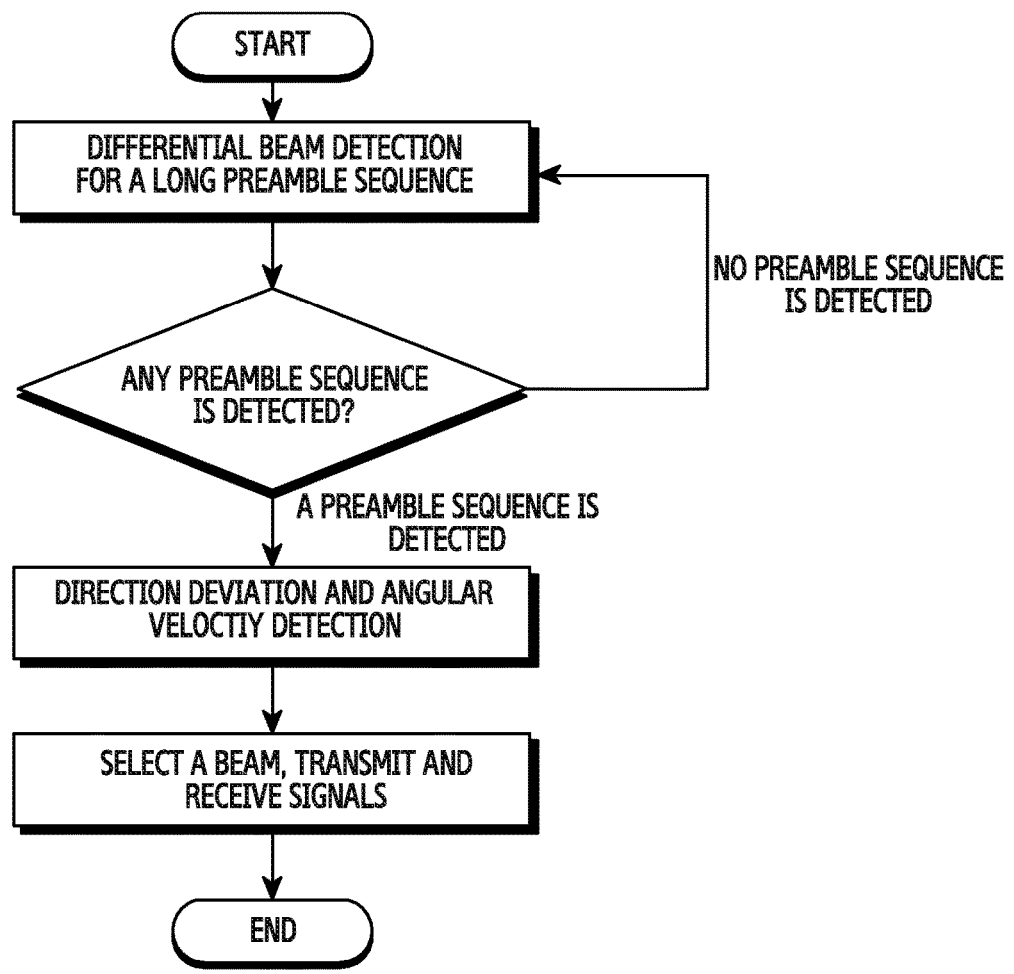
FIG. 18 illustrates a flow diagram of adjusting a beam width according to an angular speed according to the present disclosure.

Specifically, the way of detecting the angular movement velocity of the first UE comprises: first, performing preamble sequence detection on an access signal, that is, performing preamble sequence detection by using component preamble sequences, combining the correlation detection results in K detection windows to obtain the correlation detection result of the preamble sequence, and judging whether the preamble sequence is detected by the results of detection of the sum beam array and the differential beam array. Since there may be K correlation detection results when one long preamble sequence is detected, when the base station performs preamble sequence detection by the differential beamforming solution, the angular speed of the first UE with respect to the base station may be detected according to the above property, and the beam width used for transmitting and receiving the subsequent signals is adjusted. The flowchart of adjusting the beam width according to the angular speed is as shown in FIG. 18.

If the transmitting of a preamble sequence is detected in the preamble sequence detection step, K base station receiving direction angular deviations are calculated according to the correlation detection results of the sum beam array and the differential beam array in K continuous detection windows, the average angular speed of the first UE during the preamble sequence is calculated according to the K base station receiving direction angular deviations, and the base station receiving direction angular deviation determined in the last one detection window is used as the final base station receiving direction angular deviation. Specifically, it is assumed that, in the $K^{th}$ detection window, the base station receiving direction angular deviation $\theta_k$ is obtained from the correlation detection results of the differential beam array and the sum beam array, the average angular speed of the first UE in the $K^{th}$ detection window is $v_k=(\theta_k-\theta_{k-1})/t$, where t is the time difference between two detection windows. By combining the average angular velocities in the K detection windows, the average angular speed of the first UE in the preamble sequence detection stage is obtained, $\bar{v}=\Sigma_{k=z}^{K}v_k$. $\theta_k$, i.e., the base station receiving direction angular deviation in the last one detection window, is selected as the final base station receiving direction angular deviation.

After detecting and determining the base station receiving direction angular deviation and the average angular speed of the first UE, the base station selects a proper beam to transmit and receive the subsequent signals. Specifically, a low UE angular speed corresponds to a narrow beam width; a high UE angular speed corresponds to a wide beam width. According to the average angular speed determined by the above-described methods, the base station selects a proper beam width. During a random access procedure, the base station adjusts the base station beam direction according to the determined base station receiving direction angular deviation $\theta_k$, and selects beamforming coefficients by using the beam width obtained by the above process to transmit and receive signals in the subsequent steps.

Figure 19:
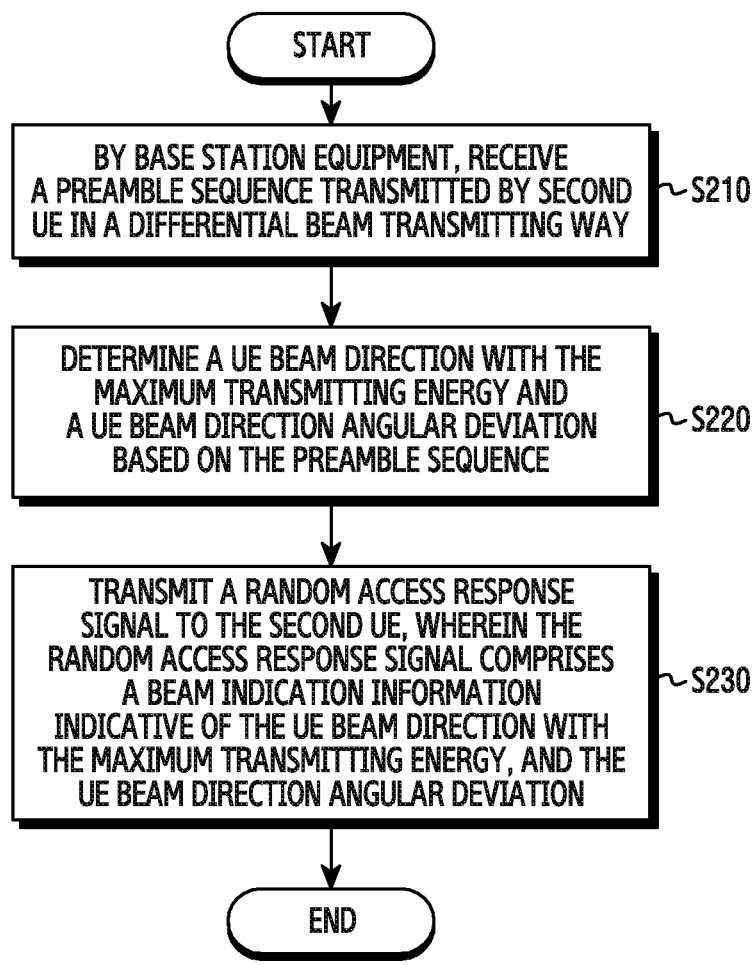
FIG. 19 illustrates a flow diagram of a differential beamforming based random access method according to another embodiment of the present disclosure.

FIG. 19 illustrates a flow diagram of a differential beamforming based random access method according to another embodiment of the present disclosure.

S210: By base station, a preamble sequence transmitted by a second UE in a differential beamforming transmitting mode is received; S220: a UE beam direction with the maximum transmitting energy and a UE beam direction angular deviation are determined based on the preamble sequence; and S230: a random access response signal is transmitted to the second UE, wherein the random access response signal comprises a beam indication information indicative of a UE beam direction with the maximum transmitting energy, and the UE beam direction angular deviation.

S210 comprises S211 and S212. S211: The base station receives an access signal transmitted by the second UE in a differential beamforming transmitting mode; and S212: preamble sequence correlation detection is performed on the access signal to determine that the access signal comprises any preamble sequences.

In S220, based on the preamble sequence correlation detection results, UE beam direction deviation detection is performed to determine a UE beam direction with the maximum transmitting energy and a UE beam direction angular deviation.

In S212, preamble sequence correlation detection is performed on the received access signal which is transmitted by the second UE in a plurality of UE transmitting beams through a sum beam and a differential beam.

Preferably, preamble sequence correlation detection is performed on the received access signal which is transmitted in a plurality of UE beam directions through a sum beam, to determine a fifth correlation detection result with respect to any preamble sequences; preamble sequence correlation detection is performed on the received access signal which is transmitted in a plurality of UE beam directions through a differential beam, to determine a sixth correlation detection result with respect to any preamble sequences; and determining that an access signal comprising any preamble sequences is detected in the received at least one UE beam direction, if it is judged that the fifth correlation detection result and/or the sixth correlation detection result in the received at least one UE beam direction meets a second determination condition.

The second decision condition comprises at least any one of the following: the fifth correlation detection result is greater than a third threshold, and the sixth correlation detection result is greater than the third threshold; the fifth correlation detection result is greater than a fourth threshold; or the sixth correlation detection result is greater than the fourth threshold, wherein, the third threshold is less than the fourth threshold.

Preferably, the step of performing UE beam direction deviation detection based on the preamble sequence correlation detection results to determine a UE beam direction with the maximum transmitting energy and a UE beam direction angular deviation comprises: selecting a UE beam direction with the maximum transmitting energy from at least one UE beam direction transmitting a preamble sequence; and determining a UE beam direction angular deviation, based on the fifth correlation detection result and the sixth correlation detection result in the UE beam direction with the maximum transmitting energy.

Preferably, this method further comprises S240 (not shown). S240: An Msg 3, which is transmitted by the second UE through a UE beam adjusted based on the beam indication information and the UE beam direction angular deviation, is received, and a corresponding contention resolution is transmitted.

Figure 20:
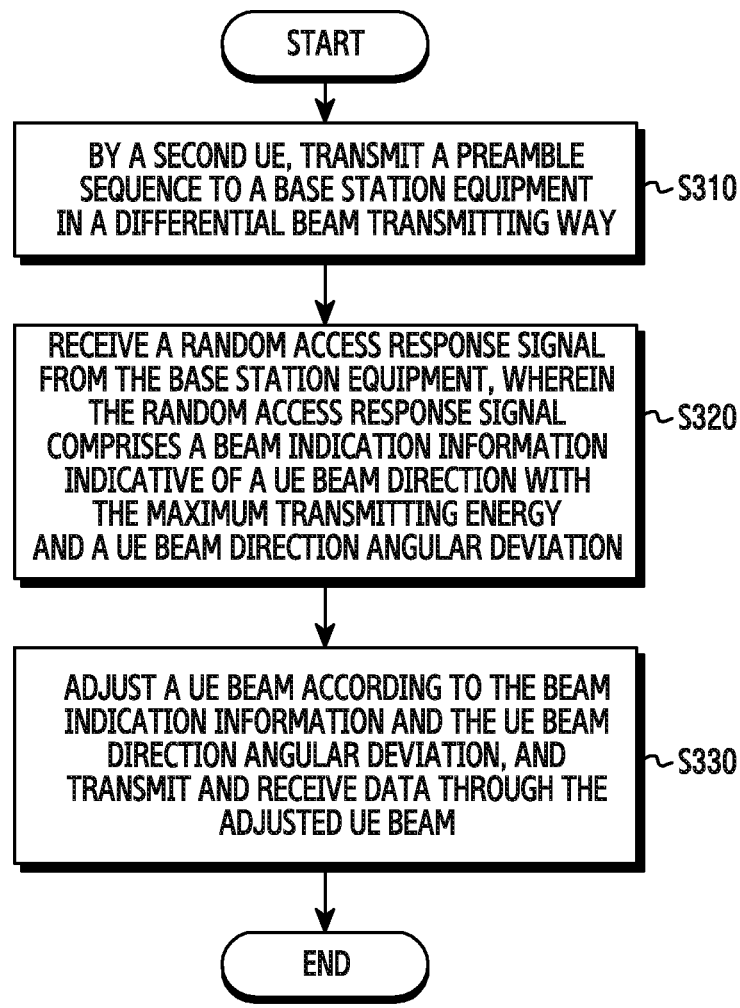
FIG. 20 illustrates a flow diagram of a differential beamforming based random access method according to still another embodiment of the present disclosure.

FIG. 20 illustrates a flow diagram of a differential beamforming based random access method according to still another embodiment of the present disclosure.

S310: By a second UE, an access signal comprising a preamble sequence is transmitted to a base station in a differential beamforming transmitting mode; S320: a random access response signal from the base station is received, wherein the random access response signal comprises an identifier of a UE beam direction with the maximum transmitting energy and a UE beam direction angular deviation; and S330: a UE beam is adjusted according to the identifier of the UE beam direction with the maximum transmitting energy and the UE beam direction angular deviation, and data is transmitted and received through the adjusted UE beam.

Specifically, the second UE transmits an access signal comprising a preamble sequence in a plurality of UE beam directions through a sum beam and a differential beam.

The sum beam uses sum beam weight coefficients as beamforming weight coefficients, and the differential beam uses differential beam weight coefficients as beamforming weight coefficients.

Preferably, in S330, a UE beam direction and a UE beam width are adjusted according to the identifier of the UE beam direction with the maximum transmitting energy and the UE beam direction angular deviation.

Preferably, the preamble sequence is transmitted in the UE beam direction by using a third beam width; an Msg3 is transmitted in the adjusted UE beam direction by using a fourth beam width; and the third beam width is not less than the fourth beam width.

Preferably, in S310, an access signal comprising a preamble sequence is transmitted to the base station in a random access channel in a differential beamforming transmitting mode.

More preferably, the random access channel comprises a plurality of random access sub-channels each corresponding to one UE beam direction.

More preferably, the preamble sequence consists of a first sequence part and a second sequence part, in a random access sub-channel the first sequence part is transmitted through a sum beam, and the second sequence part is transmitted through a differential beam.

More preferably, the preamble sequence is transmitted in two adjacent random access sub-channels through a sum beam, respectively.

Optionally, the preamble sequence is transmitted in a random access channel through a sum beam and a differential beam with predetermined time-frequency resources.

The predetermined time-frequency resources at least include:

different time-domain resources; different frequency-domain resources; orthogonal codes in same time-frequency resources.

In a fifth specific application scenario of the present disclosure, the base station and the second UE use a transmission structure based on an antenna array. In this embodiment, a random access procedure in which the second UE uses a differential beamforming transmitting mode while the base station uses a conventional polling way will be described.

Second UE transmits an access signal comprising a preamble sequence to a base station in a differential beamforming transmitting mode, wherein the preamble sequence is transmitted in a random access channel. The second UE transmits a preamble sequence in a differential beamforming transmitting mode.

Specifically, a preamble sequence is divided into two parts: a first sequence part transmitted through a sum beam, i.e., the sum beam sequence; and a second sequence part transmitted through a differential beam, i.e., the differential beam sequence. A corresponding random access channel is as shown in FIG. 21.

Figure 21:
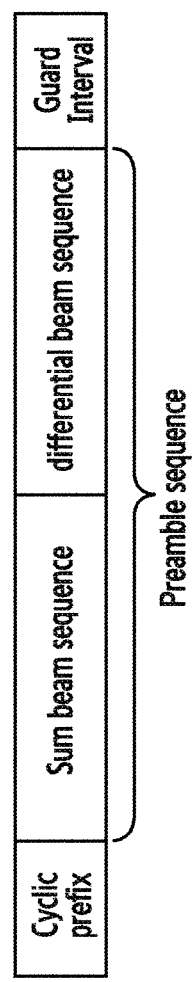
FIG. 21 illustrates a diagram of a random access channel structure transmitting a preamble sequence in a differential beamforming transmitting mode according to the present disclosure.

In a structure as shown in FIG. 21, the sum beam sequence and the differential beam sequence belong to a same preamble sequence. However, the sum beam sequence, i.e., the first half part of the preamble sequence in FIG. 21, is transmitted through a sum beam with following beamforming weight coefficients:

$$w_{sum}^{U} = [1, e^{\frac{j2\pi \sin(\varphi)d}{\lambda}}, \ldots, e^{\frac{j2\pi(N_{UE}-1)\sin(\varphi)d}{\lambda}}]^T$$

where $N_{UE}$ is the number of antennas used by UE beamforming, $\varphi$ is a direction to which beamforming is pointed, d is an antenna elements spacing of the receiving array, $\lambda$ is the wavelength of a received signal; and the sum beam weight coefficients can be a $N_{UE}$ dimensional vector, wherein the $n^{th}$ element is $$w_{sum}(n) = e^{\frac{j2\pi(n-1)\sin(\theta)d}{\lambda}},$$

where $1 \leq n \leq N_{UE}$; and the second half part in FIG. 21 is transmitted through a differential beam with a following beamforming weight coefficients:

$$w_{dif}^U = \begin{bmatrix} 1, e^{\frac{j2\pi \sin(\varphi)d}{\lambda}}, \ldots, e^{\frac{j2\pi\left(\frac{N_{UE}}{2}-1\right)\sin(\varphi)d}{\lambda}}, \\ -e^{\frac{j2\pi\left(\frac{N_{UE}}{2}\right)\sin(\varphi)d}{\lambda}}, \ldots, -e^{\frac{j2\pi(N_{UE}-1)\sin(\varphi)d}{\lambda}} \end{bmatrix}^T$$

that is, the differential beam weight coefficients can be beam weight coefficient $N_{UE}$ dimensional vector, the first $N_{UE}/2$ elements of the differential beam weight coefficients vector are the same as the first $N_{UE}/2$ elements of the sum beam weight coefficients vector, and the second $N_{UE}/2$ elements of the differential beam weight coefficients vector are opposite numbers of the second $N_{UE}/2$ elements of the sum beam weight coefficients vector.

Correlation detection is performed on the sum beam sequence to obtain a correlation detection result, i.e., the receiving energy of the sum beam; and correlation detection is performed on the differential beam sequence to obtain a correlation detection result, i.e., the receiving energy of the differential beam.

Figure 22:
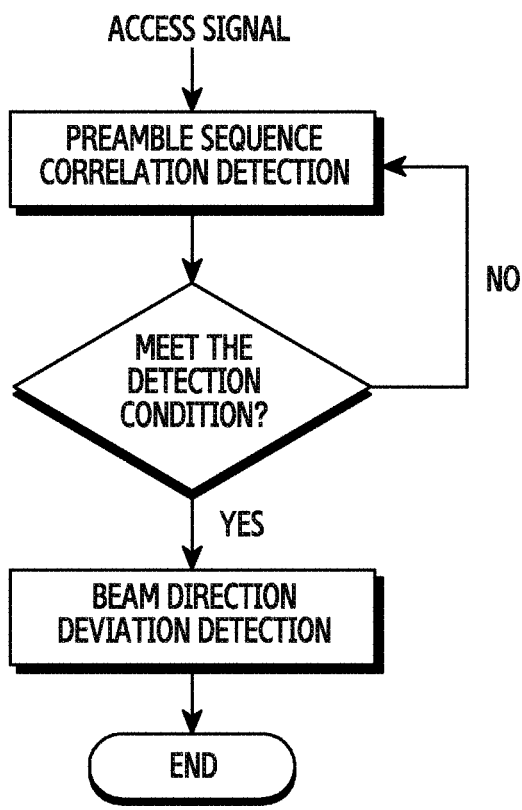
FIG. 22 illustrates a flow diagram of detecting a preamble sequence by a base station according to the present disclosure.

Specifically, as shown in FIG. 22, the base station performs correlation detection on an access signal to obtain a correlation detection result of the sum beam sequence part and a correlation detection result of the differential beam sequence part. One preferred determination procedure is as follows: it is considered that a preamble sequence is detected, if the correlation detection result $R_s$ between the sum beam sequence part and this preamble sequence, i.e., a fifth correlation detection result with respect to this preamble sequence, and the correlation detection result $R_d$ between the differential beam sequence part and this preamble sequence, i.e., a sixth correlation detection result with respect to this preamble sequence, meet one of the following conditions: a. $R_s > \eta_3$, $R_d > \eta_3$; b. $R_s > \eta_4$; c. $R_d > \eta_4$, where $\eta_3$ and $\eta_4$ are the third threshold and the fourth threshold, respectively, and $\eta_3 \leq \eta_4$. The third threshold $\eta_3$ and the fourth threshold $\eta_4$ are determined by the cell radius, the number of antennas used by the second UE and the base station for beamforming during the transmitting of the preamble sequence, the length of the preamble sequence, and other factors together.

If a certain preamble sequence is detected, the correlation detection result corresponding to this preamble sequence is used as the sum beam energy and the differential beam energy to calculate a ratio of energy, in order to obtain the UE beam direction angular deviation of the second UE.

Figure 23:
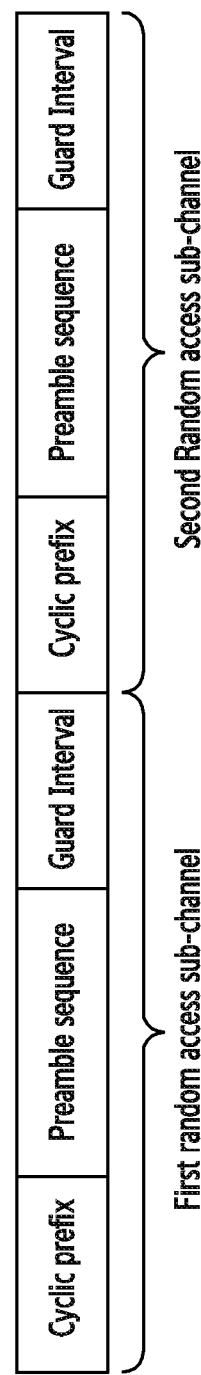
FIG. 23 illustrates a diagram of a random access channel structure transmitting a preamble sequence with different time-frequency resources according to the present disclosure.

Optionally, the same preamble sequences are transmitted with different time resources. For example, the same preamble sequences are transmitted by two continuous random access sub-channels. The first random access sub-channel uses a sum beam for transmitting; and the second random access sub-channel uses a differential beam for transmitting. As shown in FIG. 23, the first random access sub-channel uses a sum beam for transmission; and the second random access sub-channel uses a differential beam for transmission.

Preferably, the same preamble sequences are transmitted with different frequency resources, or the sum beam sequence and the differential beam sequence are transmitted by using the orthogonal codes in same time-frequency resources.

After detecting the optimal base station beam direction and the corresponding preamble sequence in polling way, the base station transmits a random access response signal. The random access response signal includes a random access preamble sequence identifier, a timing advance indication, a C-RNTI, and time-frequency resources allocated to the UE for a next uplink transmission; and the random access response signal further includes the UE beam direction angular deviation detected by the base station so that the second UE adjusts the UE beam direction conveniently. The UE beam direction angular deviation may be obtained from a lookup table. That is, the possible angular deviation values are quantified and a corresponding lookup table is made. After detecting the UE beam direction angular deviation, the base station quantifies this angular deviation, finds a corresponding index from the lookup table, and transmits the index to the second UE in the random access response signal.

The second UE receives the corresponding random access response signal, and determines the corresponding UE beam direction angular deviation according to the look up table and the angular deviation index. The UE beam direction is adjusted according to the UE beam direction angular deviation, and the Msg3 is transmitted through a beam with a narrow beam width. Upon receiving a contention resolution transmitted by the base station, the second UE receives signals in the adjusted UE beam direction through a narrow beam in order to increase the SNR.

In a sixth specific application scenario of the present disclosure, both the base station and the second UE are equipped with a transmission structure based on an antenna array, and the second UE implements a random access procedure in a differential beamforming transmitting mode.

When the antenna array equipped in the second UE consists of many antenna array elements, the second UE side can generate a beam with a narrow beam width. In order to ensure the coverage of the beam, a plurality of UE beams in different directions are required to implement the transmitting of the preamble sequence, as shown in FIG. 24.

Figure 24:
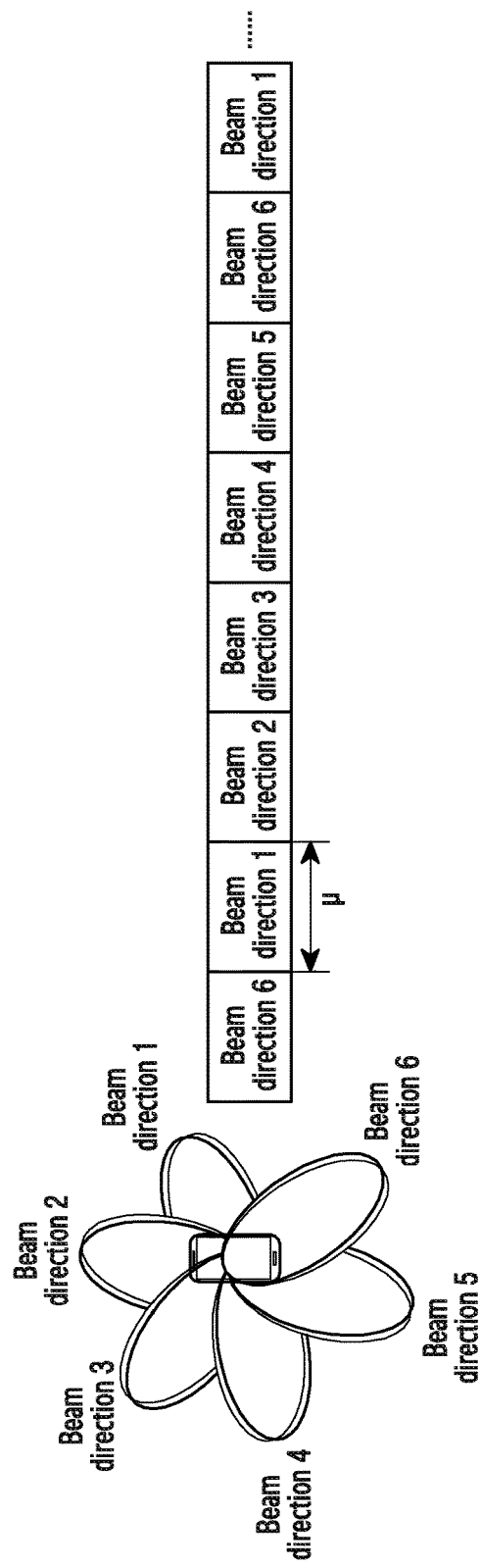
FIG. 24 illustrates a diagram of use of a differential beamforming transmitting mode by the UE side and a corresponding frame structure according to one specific embodiment of the present disclosure.

As shown in FIG. 24, two superposed beams denote a pair of sum/differential beams in a same direction. The second UE uses six sum/differential beam pairs to implement the coverage of the space. When the preamble sequence is transmitted, the second UE transmits the preamble sequence by using each sum/differential beam pair in an order from beam direction 1 to beam direction 6. If the base station side also uses a plurality of beam directions, the second UE repeatedly transmits the preamble sequence for many times in an order from beam direction 1 to beam direction 6.

The preamble sequences transmitted by beam pairs in different directions may be the same or different. When a same preamble sequence is to be transmitted, the second UE randomly selects one preamble sequence from an available preamble sequence resource pool and transmits the preamble sequence; when a different preamble sequence is to be transmitted in the different beam directions, the available preamble sequence resource pool is divided into several disjoint resource pool subsets, and each beam direction corresponds to one resource pool subset. When transmitting the preamble sequence, the second UE randomly selects one preamble sequence from each resource pool subset, and in turn transmits the preamble sequence through a corresponding beam pair, respectively.

After detecting the transmitting of a preamble sequence, the base station may transmit, to the second UE, the UE beam direction with the maximum energy and the corresponding UE beam direction angular deviation in a random access response signal.

Specifically, if the second UE transmits a same preamble sequence through U E beams in different directions, the base station determines the transmitting energy of each UE beam direction to obtain a time slot with the maximum transmitting energy, estimates the UE beam direction angular deviation of the second UE in this time slot, and transmits, to the second UE, the index of the time slot and the quantified value of the UE beam direction angular deviation in a random access response signal. After receiving the random access response signal, the second UE obtains the beam direction with the maximum transmitting energy, and adjusts and selects, according to the UE beam direction angular deviation, the optimal narrow beam to transmit and receive the subsequent signals.

If the second UE transmits a different preamble sequence through UE beams in different directions, the base station determines the transmitting energy of each UE beam direction to obtain the preamble sequence with the maximum transmitting energy, and estimates the UE beam direction angular deviation of the UE beam direction corresponding to t his preamble sequence. The base station transmits the preamble sequence identifier and the quantified value of the UE beam direction angular deviation in the random access response signal. After receiving the RAR, the second UE obtains the UE beam direction with the maximum transmitting energy according to the preamble sequence, and selects, according to the UE beam direction angular deviation, the optimal narrow beam to transmit and receive the subsequent signals.

During the random access procedure, the second UE needs to receive the random access response signal transmitted by the base station. Specifically, the second UE receives the RAR in two ways: 1) the second UE receives the RAR with an omnidirectional antenna, and adjusts the beam used for transmitting and receiving the subsequent signals according to the information about the UE beam with the maximum transmitting energy and the UE beam direction angular deviation in the random access response signal; and 2) the second UE scans all beam directions, and acquires information about the random access response signal.

In this embodiment, compared with the conventional beam polling based random access solution, the use of a random access procedure in a differential beamforming transmitting mode on the UE side may reduce the time required to search an optimal beam pair. This is because the differential beamforming transmitting mode may determine an angular deviation in a high precision. Hence, when a preamble sequence is transmitted by UE, a wide beam may be used, the UE beam direction may be adjusted according to the UE beam direction angular deviation carried in the random access response signal, and the receiving and transmitting of signals in the subsequent steps may be implemented by a narrow beam. In this way, the number of times of transmitting a preamble sequence on the UE side may be significantly reduced.

It is to be noted that the ways as described in the fifth specific application scenario and the sixth specific application scenario are applicable to a contention-based random access procedure. Wherein, the UE side transmits a preamble sequence in a differential way, and the base station detects the preamble sequence, determines the UE beam direction angular deviation and notifies the UE in random access response information is also applicable to a contention-free random access procedure. The difference lies in that: the preamble sequence transmitted by the UE is allocated by the base station; after the UE receives the random access response information and the UE beam direction angular deviation or the like, the random access procedure ends; and the UE subsequently adjusts the beam width and the beam direction for the subsequent communication with the base station.

Figure 25:
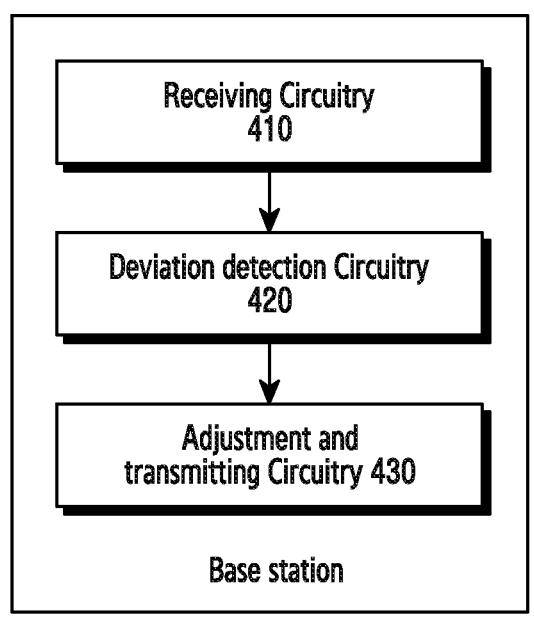
FIG. 25 illustrates a structure diagram of base station for differential beamforming based random access according to one embodiment of the present disclosure.

FIG. 25 illustrates a structure diagram of base station for differential beamforming based random access according to one embodiment of the present disclosure.

Referring FIG. 25, the base station comprises a receiving circuitry 410, a deviation detection circuitry 420 and an adjustment and transmitting circuitry 430; the receiving circuitry 410 is configured to receive a preamble sequence from a first UE in a differential beamforming receiving mode; the deviation detection module 420 is configured to determine a base station beam direction angular deviation based on the preamble sequence; and the adjustment and transmitting circuitry 430 is configured to adjust a base station beam according to the base station beam direction angular deviation, and transmit a random access response signal to the first UE through the adjusted base station beam. The receiving circuitry 410 may be referred as 'a receiver'. The deviation detection module 420 may be referred as 'a controller' or 'a control module'. The adjustment and transmitting circuitry 430 may be separated at least two (2) component (e.g., the controller and a transmitter). Specifically, a component having a transmission function of the adjustment and transmitting circuitry 430 may be referred as 'the transmitter' or 'a transmitting circuitry', and another component having an adjustment function of the adjustment and transmitting circuitry 430 may be referred as 'the controller' or 'the control module'.

Preferably, the receiving circuitry 410 receives a preamble sequence from the first UE in a plurality of base station beam directions through a sum beam and a differential beam.

Preferably, the receiving circuitry 410 is specifically configured to receive an access signal from the first UE in a differential beamforming receiving mode; and perform preamble sequence correlation detection on the access signal to determine that the access signal comprises any preamble sequences.

Preferably, the deviation detection module 420 is specifically configured to perform, based on preamble sequence correlation detection results, base station beam direction deviation to determine a base station beam direction angular deviation.

Preferably, the way that the receiving circuitry 410 performs preamble sequence correlation detection on the access signal comprises: performing preamble sequence correlation detection on the access signal in a plurality of base station beam directions through a sum beam and a differential beam.

Preferably, the sum beam uses sum beam weight coefficients as a beamforming weight coefficient, and the differential beam uses differential beam weight coefficients as beamforming weight coefficient.

Preferably, the sum beam weight coefficients are divided into a first sum beam part and a second sum beam part, and the differential beam weight coefficients are divided into a first differential beam part and a second differential beam part, wherein the first sum beam part is the same as the first differential beam part, and a plurality of elements in the second differential beam part are opposite numbers of corresponding elements in the second sum beam part.

Preferably, the sum beam weight coefficients can be expressed by the following equation:

$$w_{sum} = \left[1, e^{\frac{j2\pi \sin(\theta)d}{\lambda}}, \ldots, e^{\frac{j2\pi(N_{sum}-1)\sin(\theta)d}{\lambda}}\right]^T$$

where $N_{sum}$ is the number of antennas used by a receiving array using the sum beam weight coefficients, θ is a sum beam central direction, d is an antenna elements spacing of the sum beam array, λ is the wavelength of a transmitted signal; and the sum beam weight coefficients can be beam weight coefficient $N_{sum}$ dimensional vector, wherein the $n^{th}$ element $$w_{sum}(n) = e^{\frac{j2\pi(n-1)sin(\theta)d}{\lambda}},$$

where $1 \le n \le N_{sum}$; and the differential beam weight coefficients can be expressed by the following equation:

$$w_{dif} = \begin{bmatrix} 1, e^{\frac{j2\pi sin(\theta)d}{\lambda}}, \ldots, e^{\frac{j2\pi\left(\frac{N_{dif}}{2}-1\right)sin(\theta)d}{\lambda}}, \\ -e^{j2\pi\left(\frac{N_{dif}}{2}\right)sin(\theta)d}{\lambda}}, \ldots, -e^{\frac{j2\pi(N_{dif}-1)sin(\theta)d}{\lambda}} \end{bmatrix}^T$$

where $N_{dif}$ is the number of antennas used by a transmitting array using the differential beam weight coefficients, and $N_{sum}=N_{dif}$; and the differential beam weight coefficients can be beam weight coefficient $N_{dif}$ dimensional vector, wherein the first $N_{dif}/2$ elements of the differential beam weight coefficients are the same as the first $N_{sum}/2$ elements of the sum beam weight coefficients, and the second $N_{dif}/2$ elements of the differential beam weight coefficients are opposite numbers of the second $N_{sum}/2$ elements of the sum beam weight coefficients.

Preferably, the step of performing preamble sequence correlation detection on the access signal in a plurality of base station beam directions through a sum beam and a differential beam comprises: performing preamble sequence correlation detection on the access signal in a plurality of base station beam directions through a sum beam, to determine a first correlation detection result with respect to any preamble sequences; performing preamble sequence correlation detection on the access signal in the plurality of base station beam directions through a differential beam, to determine a second correlation detection result with respect to any preamble sequences; and determining that an access signal comprising any preamble sequences is detected in at least one base station beam direction, if it is judged that the first correlation detection result and/or the second correlation detection result in at least one base station beam direction meets a first determination condition.

The first determination condition comprises at least any one of the following: the first correlation detection result is greater than a first threshold, and the second correlation detection result is greater than the first threshold; the first correlation detection result is greater than a second threshold; or the second correlation detection result is greater than the second threshold, wherein, the first threshold is less than the second threshold.

Preferably, the step of performing base station beam direction deviation detection based on the preamble sequence correlation detection results to determine a base station beam direction angular deviation comprises: selecting a base station beam direction with the maximum receiving energy from at least one base station beam direction receiving any preamble sequences; and determining a base station beam direction angular deviation, based on the first correlation detection result and the second correlation detection result in the base station beam direction with the maximum receiving energy.

Preferably, the deviation detection module 420 adjusts a base station beam direction and a base station beam width according to the base station beam direction angular deviation.

Preferably, a first beam width in the base station beam direction is used to receive the preamble sequence and perform correlation detection; A second beam width in the adjusted base station beam direction is used to transmit a random access response signal; and the first beam width is not less than the second beam width.

Preferably, when a preamble sequence is transmitted by the first UE in a differential beamforming transmitting mode, this base station further comprises a third deviation detection module; and the third deviation detection module performs UE beam direction deviation detection, based on the received preamble sequence transmitted by the first UE through a sum beam and a differential beam, to determine a UE beam direction with the maximum transmitting energy and a UE beam direction angular deviation.

Preferably, a UE beam direction with the maximum transmitting energy is selected from at least one UE beam direction transmitting a preamble sequence; UE beam direction deviation detection is performed based on the preamble sequences transmitted through the sum beam and the differential beam in the UE beam direction with the maximum receiving energy, to determine a UE beam direction angular deviation.

Preferably, preamble sequence correlation detection is performed, through the sum beam and the differential beam, on the preamble sequence transmitted through the sum beam in the UE beam direction with the maximum transmitting energy, to determine a third correlation detection result; preamble sequence correlation detection is performed, through the sum beam and the differential beam, on the preamble sequence transmitted through the differential beam in the UE beam direction with the maximum transmitting energy, to determine a fourth correlation detection result; and the UE beam direction angular deviation is determined based on the third correlation detection result and the fourth correlation detection result.

Preferably, the third deviation detection module comprises a detection result acquisition unit; and the detection result acquisition unit sums the correlation detection results of the plurality of component preamble sequences as a correlation detection result of the preamble sequence.

Preferably, this base station further comprises an angular deviation determination module and an angular movement velocity determination module; the angular deviation determination module performs UE beam direction deviation detection based on the plurality of same component preamble sequences to determine a component UE beam direction angular deviation of each component preamble sequence; and the angular movement velocity determination module calculates an average value of change values of the UE beam direction based on the component UE beam direction angular deviation of each component preamble sequence, and determines an angular movement velocity of the first UE based on the calculation result.

Preferably, this base station further comprises a beam width adjustment module; and the beam width adjustment module adjusts the base station beam width according to the angular movement velocity of the first UE.

Preferably, this base station further comprises an angular deviation estimation module; and the angular deviation estimation module estimates the UE beam direction angular deviation based on the component UE beam direction angular deviation of the last one component preamble sequence.

The random access response signal at least comprises: beam indication information indicative of the UE beam direction with the maximum transmitting energy, and the UE beam direction angular deviation.

Preferably, this base station further comprises a third adjustment and transmitting circuitry; and the third adjustment and transmitting circuitry receives, through the adjusted base station beam, an Msg 3 which is transmitted by the first UE through a UE beam adjusted based on the beam indication information and the UE beam direction angular deviation, and transmits a corresponding contention resolution through the adjusted base station beam.

Preferably, this base station further comprises a configuration information transmitting circuitry; and the configuration information transmitting circuitry transmits beam configuration information by the base station; wherein the beam configuration information at least includes but is not limited to one of the following: indication information indicating whether the UE uses the differential beamforming transmitting mode; the beam width used by the UE to transmit a preamble sequence and the beam width used by the UE to transmit the subsequent data; the UE beam scanning cycle; and the base station beam scanning cycle.

The beam configuration information further comprises: indication information indicating whether the base station uses a differential beamforming receiving mode.

Preferably, if a plurality of same preamble sequences in a plurality of beam directions are detected, this base station further comprises a priority determination module and a fourth deviation detection module; the priority determination module determines a priority of a plurality of same preamble sequences in a plurality of base station beam directions; and the fourth deviation detection module selects a preamble sequence in a base station beam direction with the highest priority to perform the beam direction deviation detection.

The way of determining a priority of a plurality of same preamble sequences in a plurality of base station beam directions includes but is not limited to at least any one of the following: determining a priority in order of receiving energy, in the plurality of base station beam directions, corresponding to each of the preamble sequences; and determining a priority in order of time when each of the preamble sequences are detected in the plurality of base station beam directions.

Figure 26:
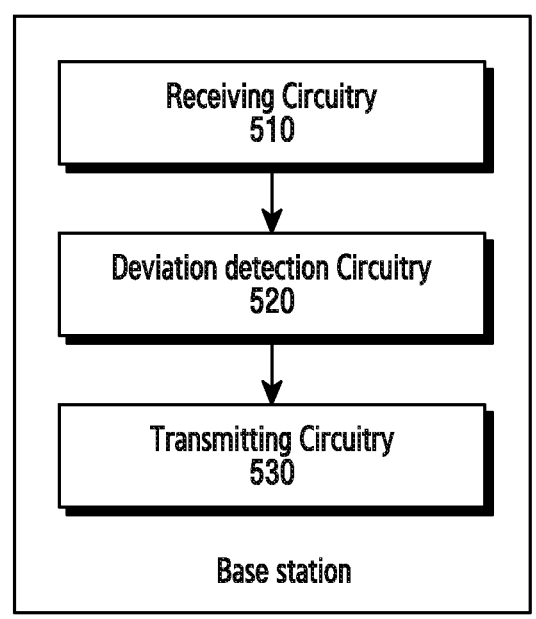
FIG. 26 illustrates another structure diagram of base station for differential beamforming based random access according to embodiment of the present disclosure.

FIG. 26 illustrates a structure diagram of base station for random access according to one embodiment of the present disclosure.

Referring FIG. 26, the base station comprises a receiving circuitry 510, a deviation detection module 520 and a transmitting circuitry 530; the receiving circuitry 510 is configured to receive a preamble sequence transmitted by a second UE in a differential beamforming transmitting mode; the deviation detection module 520 is configured to determine a UE beam direction with the maximum transmitting energy and a UE beam direction angular deviation based on the preamble sequence; and the transmitting circuitry 530 is configured to transmit a random access response signal to the second UE, wherein the random access response signal comprises a beam indication information indicative of a UE beam direction with the maximum transmitting energy, and the UE beam direction angular deviation. The receiving circuitry 510 may be referred as 'a receiver'. The deviation detection module 520 may be referred as 'a controller' or 'a control module.' The transmitting circuitry S310 may be referred as 'a transmitter'.

Preferably, the second receiving circuitry specifically comprises a receiving unit and a correlation detection unit; the receiving unit receives an access signal transmitted by the second UE in a differential beamforming transmitting mode; the correlation detection unit performs preamble sequence correlation detection on the access signal to determine that the access signal comprises any preamble sequences.

Preferably, the second deviation detection module specifically comprises a deviation detection unit; and the deviation detection unit performs, based on preamble sequence correlation detection results, UE beam direction deviation detection to determine a UE beam direction with the maximum transmitting energy and a UE beam direction angular deviation.

Preferably, the correlation detection unit is specifically configured to perform preamble sequence correlation detection on the received access signal which is transmitted by the second UE in a plurality of UE transmitting beams through a sum beam and a differential beam.

Preferably, the correlation detection unit comprises a first detection sub-unit, a second detection sub-unit and a determination sub-unit; the first detection sub-unit performs preamble sequence correlation detection on the received access signal which is transmitted in a plurality of UE beam directions through a sum beam, to determine a fifth correlation detection result with respect to any preamble sequences; the second detection sub-unit performs preamble sequence correlation detection on the received access signal which is transmitted in a plurality of UE beam directions through a differential beam, to determine a sixth correlation detection result with respect to any preamble sequences; and the determination sub-unit determines that an access signal comprising any preamble sequences is detected in the received at least one UE beam direction, if it is judged that the fifth correlation detection result and/or the sixth correlation detection result in the received at least one UE beam direction meets a second determination condition.

Preferably, the second determination condition comprises at least any one of the following: the fifth correlation detection result is greater than a third threshold, and the sixth correlation detection result is greater than the third threshold; the fifth correlation detection result is greater than a fourth threshold; or the sixth correlation detection result is greater than the fourth threshold, wherein, the third threshold is less than the fourth threshold.

Preferably, the deviation detection unit comprises a selecting and transmitting sub-unit and an angular deviation determination sub-unit; the selecting and transmitting sub-unit selects a UE beam direction with the maximum transmitting energy from at least one UE beam direction transmitting a preamble sequence; and the angular deviation determination sub-unit determines an angular deviation of the UE beam direction, based on the fifth correlation detection result and the sixth correlation detection result in the UE beam direction with the maximum transmitting energy.

Preferably, this base station further comprises a fourth adjustment and transmitting circuitry; and the fourth adjustment and transmitting circuitry receives an Msg 3, which is transmitted by the second UE through a UE beam adjusted based on the beam indication information and the UE beam direction angular deviation, and transmits a corresponding contention resolution.

Figure 27:
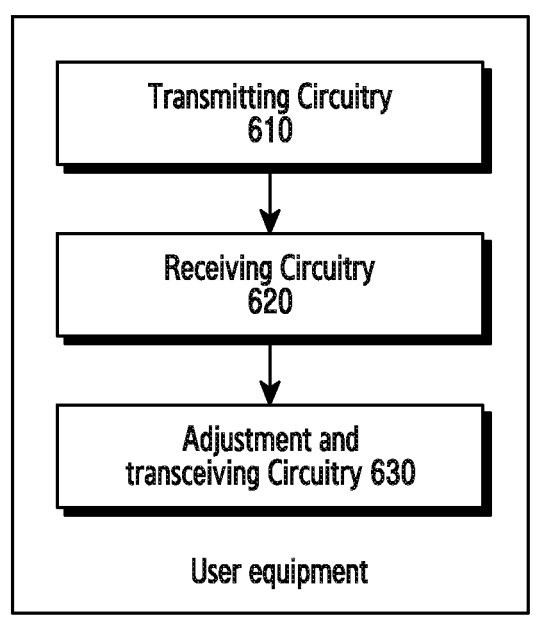
FIG. 27 illustrates yet another structure diagram of user equipment for differential beamforming based random access according to embodiment of the present disclosure.

FIG. 27 illustrates a structure diagram of UE for random access according to one embodiment of the present disclosure.

Referring FIG. 25, the UE comprises a transmitting circuitry 610, a receiving circuitry 620 and an adjustment and transceiving circuitry 630; the transmitting circuitry 610 is configured to transmit a preamble sequence to a base station in a differential beamforming transmitting mode; the receiving circuitry 620 is configured to receive a random access response signal from the base station, wherein the random access response signal comprises a beam indication information indicative of a UE beam direction with the maximum transmitting energy and a UE beam direction angular deviation; and the adjustment and transceiving circuitry 630 is configured to adjust a UE beam according to the beam indication information and the UE beam direction angular deviation, and transmit and receive data through the adjusted UE beam. The transmitting circuitry 610 may be referred as 'a transmitter'. The receiving circuitry 620 may be referred as 'a receiver'. The adjustment and transceiving circuitry 630 can be referred as 'a controller' or 'a control module'.

Preferably, the first transmitting circuitry comprises a first transmitting unit; and the first transmitting unit transmits a preamble sequence in a plurality of UE beam directions through a sum beam and a differential beam.

Preferably, the sum beam uses sum beam weight coefficients as beamforming weight coefficients, and the differential beam uses differential beam weight coefficients as beamforming weight coefficient.

Preferably, the sum beam weight coefficients can be divided into a first sum beam part and a second sum beam part, and the differential beam weight coefficients can be divided into a first differential beam part and a second differential beam part, wherein the first sum beam part is the same as the first differential beam part, and a plurality of elements in the second differential beam part are opposite numbers of corresponding elements in the second sum beam part.

Preferably, the sum beam weight coefficients can be expressed by the following equation:

$$w_{sum} = \left[1, e^{\frac{j2\pi \sin(\theta)d}{\lambda}}, \ldots, e^{\frac{j2\pi(N_{sum}-1)\sin(\theta)d}{\lambda}}\right]^T$$

where $N_{sum}$ is the number of antennas used by a receiving array using the sum beam weight coefficients, $\theta$ is a sum beam central direction, d is an antenna elements spacing of the receiving array, $\lambda$ is the wavelength of a received signal; and the sum beam weight coefficients can be beam weight coefficient dimensional vector, wherein the $n^{th}$ element is $$w_{sum}(n) = e^{\frac{j2\pi(n-1)\sin(\theta)d}{\lambda}},$$

where $\leq n \leq N_{sum}$; and

The differential beam weight coefficients can be expressed by the following equation:

$$w_{dif} = \begin{bmatrix} 1, e^{\frac{j2\pi \sin(\theta)d}{\lambda}}, \ldots, e^{j2\pi\left(\frac{N_{dif}}{2}-1\right)\frac{\sin(\theta)d}{\lambda}}, \\ -e^{j2\pi\left(\frac{N_{dif}}{2}\right)\frac{\sin(\theta)d}{\lambda}}, \ldots, -e^{\frac{j2\pi(N_{dif}-1)\sin(\theta)d}{\lambda}} \end{bmatrix}^T$$

where $N_{dif}$ is the number of antennas used by a transmitting array using the differential beam weight coefficients, and $N_{sum}=N_{dif}$; and the differential beam weight coefficients can be beam weight coefficient $N_{dif}$ dimensional vector, wherein the first $N_{dif}/2$ elements of the differential beam weight coefficients are the same as the first $N_{sum}/2$ elements of the sum beam weight coefficients, and the second $N_{dif}/2$ elements of the differential beam weight coefficients are opposite numbers of the second $N_{sum}/2$ elements of the sum beam weight coefficients.

Preferably, first transmitting circuitry specifically comprises a second transmitting unit; and the second transmitting unit transmits a same or different preamble sequence in a plurality of UE beam directions in a differential beamforming transmitting mode.

A sequence length used when a same preamble sequence is transmitted is greater than that used when a different preamble sequence is transmitted, by the second transmitting unit in a plurality of UE beam directions.

Preferably, the preamble sequence set comprises a plurality of disjoint subsets, and the second transmitting unit is specifically configured to select any preamble sequences from mutually different subsets for each of the UE beam directions, and transmit the preamble sequence in a differential beam transmitting mode.

Preferably, the second adjustment and transceiving circuitry specifically comprises an adjusting unit; and the adjusting unit adjusts a UE beam direction and a UE beam width according to the beam indication information and the UE beam direction angular deviation.

The preamble sequence is transmitted with a third beam width in a UE beam direction; an Msg 3 is transmitted with a fourth beam width in the adjusted UE beam direction; and the third beam width is not less than the fourth beam width.

Preferably, the first transmitting circuitry comprises a third transmitting unit; and the third transmitting unit transmits a preamble sequence to the base station in a random access channel in a differential beamforming transmitting mode.

The random access channel comprises a plurality of random access sub-channels each corresponding to one UE-base station beam direction pair.

Preferably, the preamble sequence consists of a first sequence part and a second sequence part, and the third transmitting unit comprises a first transmitting sub-unit; and the first transmitting sub-unit transmits the first sequence part through a sum beam, and transmits the second sequence part through a differential beam, in a random access sub-channel.

Preferably, the third transmitting unit comprises a second transmitting sub-unit; and the second transmitting sub-unit transmits the preamble sequence in two adjacent random access sub-channels through a sum beam, respectively.

Preferably, the third transmitting unit comprises a third transmitting sub-unit; and the third transmitting sub-unit transmits the preamble sequence in a random access channel through a sum beam and a differential beam with predetermined time-frequency resources.

The predetermined time-frequency resources at least include but are not limited to any one of the following: different time-domain resources; and different frequency-domain resources, orthogonal codes in same time-frequency resources.

Another embodiment of the present disclosure provides a user equipment for random access, comprising a second transmitting circuitry, a fourth receiving circuitry and a fourth transceiving module; the second transmitting circuitry is configured to transmit a preamble sequence to a base station; the fourth receiving circuitry is configured to receive a random access response signal transmitted by the base station in an adjusted base station beam direction, the random access response signal comprising a beam indication information indicative of a UE beam direction with the maximum transmitting energy; and the fourth transceiving module is configured to transmit and receive data in the UE beam direction with the maximum transmitting energy.

Preferably, the second transmitting circuitry specifically comprises a fourth transmitting unit; and the fourth transmitting unit transmits a same or different preamble sequence in a plurality of UE beam directions.

A sequence length used when a same preamble sequence is transmitted is greater than that used when a different preamble sequence is transmitted, in the plurality of UE beam directions.

Preferably, the preamble sequence set comprises a plurality of disjoint subsets, and the fourth transmitting unit is specifically configured to select any preamble sequences from mutually different subsets for each of the UE beam directions, and transmit the preamble sequence.

The preamble sequence is received by the base station through a sum beam and a differential beam.

The random access response signal is transmitted by the base station through a base station beam adjusted according to the detected base station beam direction angular deviation. It may be understood by a person of ordinary skill in the art that all or some of steps of a method for implementing the above embodiments may be done by instructing related hardware by a program which can be stored in a computer-readable storage medium and which, when executed, comprises one or a combination of steps in the method embodiments.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The descriptions above are just some implementations of the present disclosure. It should be noted that, for a person of ordinary skill in the art, various improvements and embellishments may be made without departing from the principle of the present disclosure, and those improvements and embellishments shall be regarded as falling into the protection scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A terminal in a wireless communication system, the terminal comprising:
   a transceiver; and
   at least one processor coupled to the transceiver, the at least one processor configured to:
      transmit, to a base station, a preamble sequence through a first beam and a second beam, on a random access channel; and
      receive, from the base station, a random access response signal comprising at least one indication indicating at least one of a beam direction for the terminal or an angular deviation of the beam direction,
   wherein the first beam and the second beam have different energy distributions in a same direction, and
   wherein the random access channel comprises random access sub-channels corresponding to a pair of beams direction.

2. The terminal of claim 1, wherein the transceiver is configured to transmit the preamble sequence in a plurality of beam directions through the first beam or the second beam.

3. The terminal of claim 1, wherein the transceiver is configured to transmit at least one of same preamble sequences or different preamble sequences in a plurality of beam directions.

4. The terminal of claim 3, wherein a first sequence length employed for the same preamble sequences is greater than a second sequence length employed for the different preamble sequences.

5. The terminal of claim 1, wherein the at least one processor is further configured to adjust a beam width based on at least one of the beam direction or the angular deviation.

6. The terminal of claim 1, the transceiver is configured to transmit, to the base station, the preamble sequence in a random access channel.

7. The terminal of claim 1, wherein the at least one processor is further configured to adjust a beam direction based on the beam direction for the terminal and the angular deviation of the beam direction.

8. The terminal of claim 1, wherein the angular deviation corresponds to a ratio of a first receiving energy of the preamble sequence transmitted through the first beam and a second receiving energy of the preamble sequence transmitted through the second beam.

9. A method for operating a terminal in a wireless communication system, the method comprising:
- transmitting, to a base station, a preamble sequence through a first beam and a second beam, on a random access channel; and
- receiving, from the base station, a random access response signal comprising at least one indication indicating at least one of a beam direction for the terminal or an angular deviation of the beam direction,
- wherein the first beam and the second beam have different energy distributions in a same direction, and
- wherein the random access channel comprises random access sub-channels corresponding to a pair of beams direction.

10. The method of claim 9, wherein the transmitting the preamble sequence comprises transmitting the preamble sequence in a plurality of beam directions through the first beam or the second beam.

11. The method of claim 9, wherein the transmitting the preamble sequence comprises transmitting at least one of same preamble sequences or different preamble sequences in a plurality of beam directions.

12. The method of claim 11, wherein a first sequence length employed for the same preamble sequences is greater than a second sequence length employed for the different preamble sequences.

13. The method of claim 9, further comprising adjusting a beam width based on at least one of the beam direction or the angular deviation.

14. The method of claim 9, wherein the transmitting the preamble sequence comprises transmitting, to the base station, the preamble sequence in a random access channel.

15. The method of claim 9, further comprising adjusting a beam direction based on the beam direction for the terminal and the angular deviation of the beam direction.

16. The method of claim 9, wherein the angular deviation corresponds to a ratio of a first receiving energy of the preamble sequence transmitted through the first beam and a second receiving energy of the preamble sequence transmitted through the second beam.

17. A base station in a wireless communication system, the base station comprising:
- a transceiver; and
- at least one processor coupled to the transceiver, the at least one processor configured to:
  - receive, from a terminal, a preamble sequence transmitted through a first beam and a second beam, on a random access channel;
  - determine a beam direction for the terminal and an angular deviation of the beam direction based on the preamble sequence; and
  - transmit, to the terminal, a random access response signal comprising at least one indication indicating at least one of the beam direction, or the angular deviation,
- wherein the first beam and the second beam have different energy distributions in a same direction, and
- wherein the random access channel comprises random access sub-channels corresponding to a pair of beams direction.

18. The base station of claim 17, wherein the preamble sequence is transmitted by the terminal in a plurality of beam directions.

* * * * *